US010697474B2

(12) United States Patent
Kumaou

(10) Patent No.: US 10,697,474 B2
(45) Date of Patent: Jun. 30, 2020

(54) IMPELLER OF CENTRIFUGAL FAN AND METHOD AND APPARATUS FOR MANUFACTURING THE SAME

(71) Applicant: DAIKIN INDUSTRIES, LTD., Osaka-shi, Osaka (JP)

(72) Inventor: Shigeo Kumaou, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/065,989

(22) PCT Filed: Aug. 10, 2016

(86) PCT No.: PCT/JP2016/073637
§ 371 (c)(1),
(2) Date: Jun. 25, 2018

(87) PCT Pub. No.: WO2017/115490
PCT Pub. Date: Jul. 6, 2017

(65) Prior Publication Data
US 2019/0010961 A1    Jan. 10, 2019

(30) Foreign Application Priority Data

Dec. 28, 2015    (JP) .................................. 2015-257011
Dec. 28, 2015    (JP) .................................. 2015-257012

(51) Int. Cl.
*F04D 29/66*    (2006.01)
*F04D 29/30*    (2006.01)
(Continued)

(52) U.S. Cl.
CPC .............. *F04D 29/666* (2013.01); *B06B 1/02* (2013.01); *B23K 20/10* (2013.01); *B23K 20/106* (2013.01);
(Continued)

(58) Field of Classification Search
CPC ...... F04D 29/28; F04D 29/281; F04D 29/282; F04D 29/30; F04D 29/62; F04D 29/626;
(Continued)

(56) References Cited

U.S. PATENT DOCUMENTS 5,558,499 A  *  9/1996  Kobayashi ............ F04D 29/023
                                                        416/186 R
6,156,090 A  *  12/2000  Ishikawa ................. F04D 29/30
                                                        55/471
(Continued)

FOREIGN PATENT DOCUMENTS

EP    2 264 320 A1    12/2010
JP    10-156555 A     6/1998
(Continued)

OTHER PUBLICATIONS

International Preliminary Report of corresponding PCT Application No. PCT/JP2016/073637 dated Jul. 12, 2018.
(Continued)

*Primary Examiner* — Kenneth J Hansen
*Assistant Examiner* — Aye S Htay
(74) *Attorney, Agent, or Firm* — Global IP Counselors, LLP

(57) ABSTRACT

An impeller of a centrifugal fan includes multiple blades arranged annularly around a rotational axis, a main plate, a shroud, main plate-side welded portions between main plate-side blade axial ends of the blades and the main plate, and shroud-side welded portions between shroud-side blade axial ends of the blades and the shroud. The main plate is arranged opposite to main plate-side blade axial ends. The shroud is arranged opposite to shroud-side blade axial ends. The main plate-side welded portions have main plate-side welding holes that are recesses extending through the main plate to portions of the main plate-side blade axial ends. The
(Continued)

shroud-side welded portions have shroud-side welding holes that are recesses extending through the shroud to portions of the shroud-side blade axial ends.

7 Claims, 22 Drawing Sheets

(51) Int. Cl.
  *F04D 29/62*   (2006.01)
  *B23K 20/10*   (2006.01)
  *F04D 29/28*   (2006.01)
  *B06B 1/02*   (2006.01)
  *B29C 65/08*   (2006.01)
  *B29C 65/00*   (2006.01)
  *B29L 31/08*   (2006.01)

(52) U.S. Cl.
  CPC .............. *B29C 65/08* (2013.01); *B29C 66/21* (2013.01); *B29C 66/54* (2013.01); *B29C 66/81429* (2013.01); *B29C 66/81433* (2013.01); *B29C 66/8322* (2013.01); *B29C 66/8432* (2013.01); *F04D 29/28* (2013.01); *F04D 29/281* (2013.01); *F04D 29/282* (2013.01); *F04D 29/30* (2013.01); *F04D 29/62* (2013.01); *F04D 29/624* (2013.01); *F04D 29/626* (2013.01); *B29L 2031/08* (2013.01)

(58) Field of Classification Search
  CPC ................ F04D 29/624; F04D 29/666; B23K 20/10–106; B23K 2101/001
  USPC .............................. 228/110.1, 1.1, 164–172; 29/889.1–889.722
  See application file for complete search history.

(56) References Cited

U.S. PATENT DOCUMENTS

| | | | | |
|---|---|---|---|---|
| 6,386,831 | B1* | 5/2002 | Stahl et al. | |
| 2007/0014675 | A1* | 1/2007 | Nagamatsu | F04D 25/0613 417/354 |
| 2009/0047133 | A1* | 2/2009 | Nishino | F04D 29/023 416/213 A |
| 2010/0196163 | A1* | 8/2010 | Yagi | F04D 29/023 416/214 R |
| 2010/0243172 | A1 | 9/2010 | Blanchard et al. | |
| 2011/0182748 | A1* | 7/2011 | Kwok | F04D 29/023 416/241 R |
| 2015/0071781 | A1* | 3/2015 | Kurihara | F04D 29/282 416/186 R |
| 2015/0071782 | A1 | 3/2015 | Bahren et al. | |
| 2015/0167674 | A1* | 6/2015 | Kurihara | F04D 29/30 415/206 |
| 2015/0275922 | A1* | 10/2015 | Son | F04D 17/10 415/206 |
| 2015/0377247 | A1* | 12/2015 | Laurila | F04D 29/288 416/1 |
| 2016/0115967 | A1* | 4/2016 | Kurihara | F04D 29/624 416/189 |
| 2016/0177966 | A1* | 6/2016 | Kim | F04D 17/16 416/234 |
| 2017/0260997 | A1* | 9/2017 | Mola | B22F 3/1055 |

FOREIGN PATENT DOCUMENTS

| | | |
|---|---|---|
| JP | 2008-111393 A | 5/2008 |
| JP | 2010-69492 A | 4/2010 |
| JP | 2010-510911 A | 4/2010 |
| JP | 2014-172083 A | 9/2014 |
| JP | 2015-86827 A | 5/2015 |
| WO | 2009128299 A1 | 10/2009 |

OTHER PUBLICATIONS

International Search Report of corresponding PCT Application No. PCT/JP2016/073637 dated Nov. 15, 2016.
European Search Report of corresponding EP patent Application No. 16 88 1470.5 dated Nov. 21, 2018.
European Search Report of corresponding EP Application No. 19 214 746.0 dated Mar. 13, 2020.

* cited by examiner

IMPELLER OF CENTRIFUGAL FAN AND METHOD AND APPARATUS FOR MANUFACTURING THE SAME

CROSS-REFERENCE TO RELATED APPLICATIONS

This U.S. National stage application claims priority under 35 U.S.C. § 119(a) to Japanese Patent Application Nos. 2015-257011, 2015-257012; both filed in Japan on Dec. 28, 2015, the entire contents of which are hereby incorporated herein by reference.

TECHNICAL FIELD

The present invention relates to an impeller of a centrifugal fan, and a method and apparatus for manufacturing the impeller of the centrifugal fan, and more particularly to an impeller of a centrifugal fan, and a method and apparatus for manufacturing the impeller of the centrifugal fan, where the impeller being manufactured by welding between multiple blades arranged annularly around a rotational axis and a main plate and a shroud, the main plate and the shroud being respectively arranged opposite to two blade axial ends that are both ends of each of the blades in the direction of the rotational axis.

BACKGROUND ART

In an air conditioner, an air cleaner, or the like, a centrifugal fan is used to suck, supply, and discharge air in some cases. An impeller that constitutes the centrifugal fan mainly includes: multiple blades arranged annularly around a rotational axis, and a main plate and a shroud arranged opposite to two blade axial ends that are both ends of each of the blades in the direction of the rotational axis.

As such an impeller of a centrifugal fan, there is an impeller formed by conducting ultrasonic welding to weld between main plate-side blade axial ends of blades and a main plate and weld between shroud-side axial ends of the blades and a shroud, as indicated in Japanese Laid-open Patent Publication Nos. 2008-111393 and 2015-86827. With this configuration, main plate-side welded portions are formed between the main plate-blade side axial ends and the main plate, and shroud-side welded portions are formed between the shroud-side blade axial ends and the shroud.

SUMMARY OF THE PRESENT INVENTION

In Japanese Laid-open Patent Publication No. 2015-86827, in manufacturing an impeller of a centrifugal fan by conducting ultrasonic welding, edges are formed on portions serving as main plate-side welded portions and shroud-side welded portions, and ultrasonic vibration is given to melt the edges. In addition, in Japanese Laid-open Patent Publication No. 2008-111393, in manufacturing an impeller of a centrifugal fan by conducting ultrasonic welding, through-holes and protrusions extending through the through-holes are arranged on portions serving as main plate-side welded portions and shroud-side welded portions, and ultrasonic vibration is given to melt and deform ends of the protrusions.

In the ultrasonic welding methods described in Japanese Laid-open Patent Publication Nos. 2008-111393 and 2015-86827, however, since it is necessary to form the edges, the through-holes, and the protrusions on the portions serving as the main plate-side welded portions and the shroud-side welded portions in advance, the molds and molding processes for forming these portions cause an increase in the cost, and the areas of the main plate-side welded portions and the areas of the shroud-side welded portions are also increased, With the areas of the main plate-side welded portions and the areas of the shroud-side welded portions being increased, an ultrasonic horn and an ultrasonic oscillator that give ultrasonic vibration are increased in size, resulting in another increase in cost for the ultrasonic horn and the ultrasonic oscillator, Especially, when an ultrasonic horn of a size sufficient to cover an entire main plate is used as indicated in Japanese Laid-open Patent Publication No. 2015-86827, the ultrasonic horn and an ultrasonic oscillator become excessively large.

In the aforementioned conventional ultrasonic welding methods, it is difficult to inexpensively manufacture an impeller of a centrifugal fan due to: an increase in the cost of molds and molding processes for forming, in advance, edges, through-holes, and protrusions that are required for welding; an increase in the areas of welded portions, and an increase in the size of an ultrasonic horn and the size of an ultrasonic oscillator.

An object of the present invention is to inexpensively manufacture an impeller of a centrifugal fan by welding between multiple blades arranged annularly around a rotational axis and a main plate and a shroud, the plate and the shroud being respectively arranged opposite to two blade axial ends that are both ends of each of the blades.

An impeller of a centrifugal fan according to a first aspect includes multiple blades, a main plate, and a shroud. The blades are arranged annularly around a rotational axis, and each of the blades has two blade axial ends that are both ends in the direction of the rotational axis. The main plate is arranged opposite to a main plate-side blade axial end that is one of the two blade axial ends of each of the blades. The shroud is arranged opposite to a shroud-side blade axial end that is the other of the two blade axial ends of each of the blades. The impeller of the centrifugal fan includes main plate-side welded portions between the main plate-side blade axial ends and the main plate and includes shroud-side welded portions between the shroud-side blade axial ends and the shroud. In this aspect, main plate-side welding holes that are recesses extending through the main plate to portions of the main plate-side blade axial ends are formed on the main plate-side welded portions, while shroud-side welding holes that are recesses extending through the shroud to portions of the shroud-side blade axial ends are formed on the shroud-side welded portions.

To inexpensively manufacture the impeller of the centrifugal fan by welding between the multiple blades arranged annularly around the rotational axis and the main plate and the shroud arranged opposite to two blade axial ends that are both ends of each of the blades, it is necessary to reduce molds to be used and molding processes for forming, in advance, edges, through-holes, and protrusions that are required for welding, make smaller the areas of welded portions, and downsize ultrasonic horns and an ultrasonic oscillator to be included.

Hence in this aspect, as described above, the main plate-side welded portions having the main plate-side welding holes that are the recesses extending through the main plate to the portions of the main plate-side blade axial ends are formed, and the shroud-side welded portions having the shroud-side welding holes that are the recesses extending through the shroud to the portions of the shroud-side blade axial ends are formed. The welded portions having the welding holes can be obtained by conducting ultrasonic welding using ultrasonic horns having insertion portions that are inserted into the main plate, the shroud, and the blade axial ends so that the insertion portions extend through the main plate and the shroud to portions of the blade axial ends. Specifically, in welding between the main plate-side blade axial ends and the main plate, a main plate-side ultrasonic horn having main plate-side insertion portions is used to give ultrasonic vibration to the blades and the main plate, melt the main plate-side blade axial ends and the main plate so that the main plate-side welding holes that are the recesses extending through the main plate to the portions of the main plate-side blade axial ends are formed, and form the main plate-side welded portions having the main plate-side welding holes. In addition, in welding between the shroud-side blade axial ends and the shroud, a shroud-side ultrasonic horn having shroud-side insertion portions is used to give ultrasonic vibration to the blades and the shroud, melt the shroud-side blade axial ends and the shroud so that the shroud-side welding holes that are the recesses extending through the shroud to the portions of the shroud-side blade axial ends are formed, and form the shroud-side welded portions having the shroud-side welding holes. In the case where the welded portions having the welding holes are formed, it is possible to reduce the molds and molding processes for forming, in advance, the edges, through-holes, and protrusions that are required for the conventional ultrasonic welding, and make smaller the areas of the welded portions. In addition, when the areas of the welded portions are reduced, it is possible to downsize the ultrasonic horns and reduce output of the ultrasonic oscillator.

In this aspect, therefore it is possible to inexpensively manufacture an impeller of the centrifugal fan by welding between the multiple blades arranged annularly around the rotational axis and the main plate and the shroud respectively arranged opposite to two blade axial ends that are both ends of each of the blades.

An impeller of a centrifugal fan according to a second aspect is the impeller of the centrifugal fan according to the first aspect, wherein the multiple main plate-side welding holes are arranged in blade longitudinal directions of the main plate-side blade axial ends, and the multiple shroud-side welding holes are arranged in blade longitudinal directions of the shroud-side blade axial ends.

In this aspect, it is possible to strongly weld between the main plate-side blade axial ends and the main plate and between the shroud-side blade axial ends and the shroud.

An impeller of a centrifugal fan according to a third aspect is the impeller of the centrifugal fan according to the first or second aspect, wherein the main plate has a blade-side main plate surface arranged opposite to the main plate-side blade axial ends and an opposite-blade-side main plate surface that is an opposite surface of the blade-side main plate surface in the direction of the rotational axis. In this aspect, protrusion-shaped opposite-blade-side main plate protrusions are formed on the opposite-blade-side main plate surface at positions corresponding to the main plate-side blade axial ends, recess-shaped opposite-blade-side main plate recesses are formed on the opposite-blade-side main plate protrusions, and the main plate-side welded portions are arranged on the opposite-blade-side main plate recesses.

While the main plate-side welding holes are opened on the opposite-blade-side main plate surface of the main plate, built-up portions are formed around the openings of the main plate-side welding holes by the melting of the main plate and the blades upon the welding. Since the built-up portions protrude, in the direction of the rotational axis, above the opposite-blade-side main plate surface of the main plate, the built-up portions may cause ventilation resistance during operation of the centrifugal fan and may cause noise.

In this aspect, as described above, the protrusion-shaped opposite-blade-side main plate protrusions are formed on the opposite-blade-side main plate surface at positions corresponding to the main plate-side blade axial ends, the recess-shaped opposite-blade-side main plate recesses are formed on the opposite-blade-side main plate protrusions, and the main plate-side welded portions are formed on the opposite-blade-side main plate recesses. Thus, in this aspect, the built-up portions formed around the main plate-side welding holes of the main plate-side welded portions are arranged on the opposite-blade-side main plate recesses and protrude, in the direction of the rotational axis, above the opposite-blade-side main plate recesses of the main plate, but the protrusion of the built-up portions can be downsized to a protrusion that is equal to or smaller than the opposite-blade-side main plate protrusions arranged around the opposite-blade-side main plate recesses.

This can decrease ventilation resistance caused by the built-up portions formed around the openings of the main plate-side welding holes during the operation of the centrifugal fan, in this aspect.

An impeller of a centrifugal fan according to a fourth aspect is the impeller of the centrifugal fan according to any of the first to third aspects, wherein plate-shaped shroud flat plate portions are formed on the shroud at positions corresponding to the shroud-side blade axial ends, and the shroud-side welded portions are arranged on the shroud flat plate portions.

Since the shroud is a bell-shaped member that is curved such that the diameter decreases with the increase of a distance from the blades in the direction of the rotational axis, it is not easy to weld between the bell-shaped shroud curved plate portion and the shroud-side blade axial ends.

In this aspect, as described above, the shroud flat plate portions are formed on the shroud at positions corresponding to the shroud-side blade axial ends, and the shroud-side welded portions are obtained by welding between the shroud-side blade axial ends and the shroud flat plate portions.

This makes it possible to strongly weld between the shroud-side blade axial ends and the shroud, in this aspect.

An impeller of a centrifugal fan according to a fifth aspect is the impeller of the centrifugal fan according to the fourth aspect, wherein the shroud flat plate portions are arranged to correspond to nearly central portions of the shroud-side blade axial ends in the blade longitudinal directions of the shroud-side blade axial ends.

In this aspect, since it is possible to strongly weld between the shroud-side blade axial ends and the shroud, compared with the case where blade front edge-side portions or blade rear edge-side portions of the shroud-side blade axial ends of the blades are welded together with the shroud, it is possible to make smaller the areas of the shroud flat plate portions and make smaller the areas of the shroud-side welded portions formed by the welding.

An impeller of a centrifugal fan according to a sixth aspect is the impeller of the centrifugal fan according to the fourth or fifth aspect, wherein the shroud flat plate portions are arranged opposite to the main plate-side welded portions in the direction of the rotational axis.

In welding between the main plate-side blade axial ends and the main plate, in the case where the ultrasonic vibration is given to the blades and the main plate from the main plate side, the main plate is pressed toward the shroud, and the shroud needs to be pressed toward the main plate to receive a pressing force from the main plate side. However, since the shroud is the bell-shaped member that is curved such that the diameter decreases with the increase of a distance from the blades in the direction of the rotational axis, it is not easy to appropriately press the shroud toward the main plate.

In this aspect, as described above, the shroud flat plate portions formed to weld between the shroud-side blade axial ends and the shroud are arranged opposite to the main plate-side welded portions in the directions of the rotational axis. Thus, in welding between the main plate-side blade axial ends and the main plate, the ultrasonic vibration can be given to the blades and the main plate from portions of the main plate that are arranged opposite to the shroud flat plate portions in the direction of the rotational axis, while the shroud flat plate portions of the shroud that are more effective for pressing toward the main plate than the shroud curved plate portion are pressed toward the main plate. Especially, in this aspect, since the shroud flat plate portions are arranged opposite to the main plate-side welded portions in the direction of the rotational axis, the portions of the shroud that most need to be pressed toward the main plate can be appropriately pressed.

As a result, the shroud can be appropriately pressed toward the main plate in welding between the main plate-side blade axial ends and the main plate, in this aspect.

An impeller of a centrifugal fan according to a seventh aspect is the impeller of the centrifugal fan according to any of the first to sixth aspects, wherein the shroud has a blade-side shroud surface arranged opposite to the shroud-side blade axial ends and an opposite-blade-side shroud surface that is an opposite surface of the blade-side shroud surface in the direction of the rotational axis. In this aspect, shroud flat surfaces are formed on the opposite-blade-side shroud surface and arranged opposite to the main plate-side welded portions in the direction of the rotational axis.

In welding between the main plate-side blade axial ends and the main plate, in the case where the ultrasonic vibration is given to the blades and the main plate from the main plate side, the main plate is pressed toward the shroud, and the shroud needs to be pressed toward the main plate to receive a pressing force from the main plate side. However, since the shroud is the bell-shaped member that is curved such that the diameter decreases with the increase of a distance from the blades in the direction of the rotational axis, it is not easy to appropriately press the shroud toward the main plate.

In this aspect, as described above, the shroud flat surfaces are formed on the opposite-blade-side shroud surface of the shroud and arranged opposite to the main plate-side welded portions in the direction of the rotational axis. Thus, in welding between the main plate-side blade axial ends and the main plate, the ultrasonic vibration can be given to the blades and the main plate from the portions of the main plate that are arranged opposite to the shroud flat surfaces in the direction of the rotational axis, while the shroud flat surfaces of the shroud that are more effective for pressing toward the main plate than the shroud curved plate portion are pressed toward the main plate. Especially, in this aspect, since the shroud flat surfaces are arranged opposite to the main plate-side welded portions in the direction of the rotational axis, the portions of the shroud that most need to be pressed toward the main plate can be appropriately pressed.

As a result, the shroud can be appropriately pressed toward the main plate in welding between the main plate-side blade axial ends and the main plate in this aspect.

An impeller of a centrifugal fan according to an eighth aspect is the impeller of the centrifugal fan according to any of the first to seventh aspects, wherein unwelded portions are formed on the main plate-side blade axial ends or the main plate to secure gaps between the main plate-side blade axial ends and the main plate on the rear edge side of the blades with respect to the main plate-side welded portions.

The main plate-side welded portions are formed by welding between the main plate-side blade axial ends and the main plate. In this case, however, portions arranged on the rear edge side of the blades with respect to the main plate-side welded portions may be also weakly welded. If the portions arranged on the rear edge side of the blades with respect to the main plate-side welded portions are weakly welded, the weakly welded portions may be removed during the operation of the centrifugal fan and may cause abnormal noise.

In this aspect, as described above, the gaps between blade rear edge-side portions of the main plate-side blade axial ends and the main plate are secured by the unwelded portions.

This makes it possible to reduce the probability that the portions arranged on the rear edge side of the blades with respect to the main plate-side welded portions are weakly welded and decrease the occurrence of abnormal noise during the operation of the centrifugal fan.

An impeller of a centrifugal fan according to a ninth aspect is the impeller of the centrifugal fan according to any of the first to eighth aspects, wherein weir portions are formed along the blade rear edge-side portions of the main plate-side blade axial ends on the main plate.

In this aspect, the main plate and the blades are melted upon the welding of the main plate-side blade axial ends and the main plate, but the flow of melted portions from the gaps between the blade rear edge-side portions of the main plate-side blade axial ends and the main plate can be decreased by the weir portions.

A method for manufacturing an impeller of a centrifugal fan according to a tenth aspect is a method for manufacturing an impeller of a centrifugal fan by welding between multiple blades arranged annularly around a rotational axis and a main plate and a shroud, the plate and the shroud being respectively arranged opposite to two blade axial ends that are both ends of each of the blades. In the method for manufacturing the impeller of the centrifugal fan, in welding between a main plate-side blade axial end that is one of two blade axial ends of each of the blades and the main plate, and welding between a shroud-side blade axial end that is the other of the two blade axial ends of each of the blades and the shroud, the following welding method is applied. In welding between the main plate-side blade axial ends and the main plate, ultrasonic vibration is given to the blades and the main plate, and the main plate-side blade axial ends and the main plate are melted so that main plate-side welding holes that are recesses extending through the main plate to portions of the main plate-side blade axial ends are formed. In addition, in welding between the shroud-side blade axial ends and the shroud, ultrasonic vibration is given to the blades and the shroud, and the shroud-side blade axial ends and the shroud are melted so that shroud-side welding holes that are recesses extending through the shroud to portions of the shroud-side blade axial ends are formed.

To inexpensively manufacture the impeller of the centrifugal fan by welding between the multiple blades arranged annularly around the rotational axis and the main plate and a shroud arranged opposite to two blade axial ends that are both ends of each of the blades in the direction of the rotational axis, it is necessary to reduce molds to be used and molding processes for forming, in advance, edges, through-holes, and protrusions that are required for welding, make smaller the areas of welded portions, and downsize ultrasonic horns and an ultrasonic oscillator to be included.

In this aspect, as described above, in welding between the main plate-side blade axial ends and the main plate, the ultrasonic vibration is given to the blades and the main plate, and the main plate-side blade axial ends and the main plate are melted so that the main plate-side welding holes that are the recesses extending through the main plate to the portions of the main plate-side blade axial ends are formed. In addition, in welding between the shroud-side blade axial ends and the shroud, the ultrasonic vibration is given to the blades and the shroud, and the shroud-side blade axial ends and the shroud are melted so that the shroud-side welding holes that are the recesses extending through the shroud to the portions of the shroud-side blade axial ends are formed. The welding holes formed by the ultrasonic welding method constitute the welded portions between the blades and the main plate and between the blades and the shroud, and can be obtained by using ultrasonic horns having insertion portions that are inserted into the main plate, the shroud, and the blade axial ends so that the insertion portions extend through the main plate and the shroud to portions of the blade axial ends. Specifically, in welding between the main plate-side blade axial ends and the main plate, a main plate-side ultrasonic horn having main plate-side insertion portions is used to give the ultrasonic vibration to the blades and the main plate, melt the main plate-side blade axial ends and the main plate so that the main plate-side welding holes that are the recesses extending through the main plate to the portions of the main plate-side blade axial ends are formed, and form main plate-side welded portions having the main plate-side welding holes. In addition, in welding between the shroud-side blade axial ends and the shroud, a shroud-side ultrasonic horn having shroud-side insertion portions is used to give the ultrasonic vibration to the blades and the shroud, melt the shroud-side blade axial ends and the shroud so that the shroud-side welding holes that are the recesses extending through the shroud to the portions of the shroud-side blade axial ends are formed, and form shroud-side welded portions having the shroud-side welding holes. In the case where the welded portions having the welding holes are formed, it is possible to reduce the molds and molding processes for forming, in advance, the edges, through-holes, and protrusions that are required for the conventional ultrasonic welding, and make smaller the areas of the welded portions. When the areas of the welded portions are reduced, it is possible to downsize the ultrasonic horns and reduce output of the ultrasonic oscillator.

In this aspect, it is possible to inexpensively manufacture the impeller of the centrifugal fan by welding between the multiple blades arranged annularly around the rotational axis and the main plate and the shroud arranged opposite to two blade axial ends that are both ends of each of the blades.

A method for manufacturing an impeller of a centrifugal fan according to an eleventh aspect is the method for manufacturing the impeller of the centrifugal fan according to the tenth aspect, wherein the ultrasonic vibration is given to the blades and the main plate so that the multiple main plate-side welding holes are arranged in blade longitudinal directions of the main plate-side blade axial ends, and the ultrasonic vibration is given to the blades and the shroud so that the multiple shroud-side welding holes are arranged in blade longitudinal directions of the shroud-side blade axial ends.

In this aspect, it is possible to strongly weld between the main plate-side blade axial ends and the main plate and strongly weld between the shroud-side blade axial ends and the shroud.

A method for manufacturing an impeller of a centrifugal fan according to a twelfth aspect is the method for manufacturing the impeller of the centrifugal fan according to the tenth or eleventh aspect, wherein the welding between each of the main plate-side blade axial ends and the main plate and the welding between each of the shroud-side blade axial ends and the shroud are conducted sequentially for each of the multiple blades.

In this aspect, it is sufficient if ultrasonic horns for welding together one of the blades and the main plate and the shroud are prepared as the ultrasonic horns for welding between the main plate-side blade axial ends and the main plate and welding between the shroud-side blade axial ends and the shroud.

This makes it possible to further downsize the ultrasonic horns and reduce the output of the ultrasonic oscillator, compared with the case where the multiple blades are collectively welded using a large ultrasonic horn having a size sufficient to cover the entire main plate and the entire shroud, in this aspect.

A method for manufacturing an impeller of a centrifugal fan according to a thirteenth aspect is the method for manufacturing the impeller of the centrifugal fan according to any of the tenth to twelfth aspects, wherein protrusion-shaped opposite-blade-side main plate protrusions are formed on an opposite-blade-side main plate surface of the main plate at positions corresponding to the main plate-side blade axial ends, recess-shaped opposite-blade-side main plate recesses are formed on the opposite-blade-side main plate protrusions, and in welding between the main plate-side blade axial ends and the main plate, the ultrasonic vibration is given to the blades and the main plate from the opposite-blade-side main plate recesses. In this case, the main plate has a blade-side main plate surface arranged opposite to the main plate-side blade axial ends and the opposite-blade-side main plate surface that is an opposite surface of the blade-side main plate surface in the direction of the rotational axis.

While the main plate-side welding holes are opened on the opposite-blade-side main plate surface of the main plate, built-up portions are formed around the openings of the main plate-side welding holes by the melting of the main plate and the blades upon the welding. Since the built-up portions protrude, in the direction of the rotational axis, above the opposite-blade-side main plate surface of the main plate, the built-up portions may cause ventilation resistance during operation of the centrifugal fan and may cause noise.

In this aspect, as described above, the protrusion-shaped opposite-blade-side main plate protrusions are formed on the opposite-blade-side main plate surface at positions corresponding to the main plate-side blade axial ends, the recess-shaped opposite-blade-side main plate recesses are formed on the opposite-blade-side main plate protrusions, and the main plate-side welded portions are formed by giving the ultrasonic vibration from the opposite-blade-side main plate recesses. Thus, in this aspect, the built-up portions formed around the main plate-side welding holes of the main plate-side welded portions are arranged on the opposite-blade-side main plate recesses and protrude, in the direction of the rotational axis, above the opposite-blade-side main plate recesses of the main plate, but the protrusion of the built-up portions can be downsized to a protrusion that is equal to or smaller than the opposite-blade-side main plate protrusions arranged around the opposite-blade-side main plate recesses.

This can decrease ventilation resistance caused by the built-up portions formed around the openings of the main plate-side welding holes during the operation of the centrifugal fan, in this aspect.

A method for manufacturing an impeller of a centrifugal fan according to a fourteenth aspect is the method for manufacturing the impeller of the centrifugal fan according to any of the tenth to thirteenth aspects, wherein plate-shaped shroud flat plate portions are formed on the shroud at positions corresponding to the shroud-side blade axial ends, and in welding between the shroud-side blade axial ends and the shroud, the ultrasonic vibration is given to the blades and the shroud from the shroud flat plate portions.

Since the shroud is a bell-shaped member that is curved such that the diameter decreases with the increase of a distance from the blades in the direction of the rotational axis, it is not easy to weld between the bell-shaped shroud curved plate portion and the shroud-side blade axial ends.

In this aspect, as described above, the plate-shaped shroud flat plate portions are formed on the shroud at positions corresponding to the shroud-side blade axial ends, and the ultrasonic vibration is given to the blades and the shroud from the shroud flat plate portions. Thus, in this aspect, the shroud-side welded portions are formed by welding between the shroud-side blade axial ends and the shroud flat plate portions.

This makes it possible to strongly weld between the shroud-side blade axial ends and the shroud, in this aspect.

A method for manufacturing an impeller of a centrifugal fan according to a fifteenth aspect is the method for manufacturing the impeller of the centrifugal fan according to the fourteenth aspect, wherein the shroud flat plate portions are arranged to correspond to nearly central portions of the shroud-side blade axial ends in the direction of the blade longitudinal directions, and in welding between the shroud-side blade axial ends and the shroud, the ultrasonic vibration is given to the shroud flat plate portions and the nearly central portions of the shroud-side blade axial ends in the direction of the blade longitudinal directions.

In this aspect, since the shroud-side blade axial ends and the shroud can be strongly welded together, compared with the case where blade front edge-side portions or blade rear edge-side portions of the shroud-side blade axial ends of the blades are welded together with the shroud, the areas of the shroud flat plate portions and the areas of the shroud-side welded portions formed by the welding can be reduced.

A method for manufacturing an impeller of a centrifugal fan according to a sixteenth aspect is the method for manufacturing the impeller of the centrifugal fan according to the fourteenth or fifteenth aspect, wherein in welding between the main plate-side blade axial ends and the main plate, the ultrasonic vibration is given to the blades and the main plate from portions of the main plate that are arranged opposite to the shroud flat plate portions in the direction of the rotational axis, while the shroud flat plate portions are pressed toward the main plate.

In welding between the main plate-side blade axial ends and the main plate, in the case where the ultrasonic vibration is given to the blades and the main plate from the main plate side, the main plate is pressed toward the shroud, and the shroud needs to be pressed toward the main plate to receive a pressing force from the main plate side. However, since the shroud is the bell-shaped member that is curved such that the diameter decreases with the increase of a distance from the blades in the direction of the rotational axis, it is not easy to appropriately press the shroud toward the main plate.

In this aspect, as described above, in welding between the main plate-side blade axial ends and the main plate, the ultrasonic vibration is given to the blades and the main plate from the portions of the main plate that are arranged opposite to the shroud flat plate portions in the direction of the rotational axis, while the shroud flat plate portions formed to weld between the shroud-side blade axial ends and the shroud are pressed toward the main plate. Thus, in welding between the main plate-side blade axial ends and the main plate, the ultrasonic vibration can be given to the blades and the main plate from the portions of the main plate that are arranged opposite to the shroud flat plate portions in the direction of the rotational axis, while the shroud flat plate portions of the shroud that are more effective for pressing toward the main plate than the shroud curved plate portion are pressed toward the main plate. Especially, in this aspect, since the shroud flat plate portions are arranged opposite to the portions, which are included in the main plate and to which the ultrasonic vibration is given, in the direction of the rotational axis, the portions of the shroud that most need to be pressed toward the main plate can be appropriately pressed.

As a result, the shroud can be appropriately pressed toward the main plate in welding between the main plate-side blade axial ends and the main plate in this aspect.

A method for manufacturing an impeller of a centrifugal fan according to a seventeenth aspect is the method for manufacturing the impeller of the centrifugal fan according to any of the tenth to sixteenth aspects, wherein shroud flat surfaces are formed on an opposite-blade-side shroud surface of the shroud, and in welding between the main plate-side blade axial ends and the main plate, the ultrasonic vibration is given to the blades and the main plate from portions of the main plate that are arranged opposite to the shroud flat surfaces in the direction of the rotational axis, while the shroud flat surfaces are pressed toward the main plate. In this aspect, the shroud has a blade-side shroud surface arranged opposite to the shroud-side blade axial ends and the opposite-blade-side shroud surface that is an opposite surface of the blade-side shroud surface in the direction of the rotational axis.

In welding between the main plate-side blades axial ends and the main plate, in the case where the ultrasonic vibration is given to the blades and the main plate from the main plate side, the main plate is pressed toward the shroud, and the shroud needs to be pressed toward the main plate to receive a pressing force from the main plate side. However, since the shroud is the bell-shaped member that is curved such that the diameter decreases with the increase of a distance from the blades in the direction of the rotational axis, it is not easy to appropriately press the shroud toward the main plate.

In this aspect, as described above, the shroud flat surfaces are formed on the opposite-blade-side shroud surface of the shroud, and in welding between the main plate-side blade axial ends and the main plate, the ultrasonic vibration is given to the blades and the main plate from the portions of the main plate that are arranged opposite to the shroud flat surfaces in the direction of the rotational axis, while the shroud flat surfaces are pressed toward the main plate. Thus, in welding between the main plate-side blade axial ends and the main plate, the ultrasonic vibration can be given to the blades and the main plate from the portions of the main plate that are arranged opposite to the shroud flat surfaces in the direction of the rotational axis, while the shroud flat surfaces of the shroud that are more effective for pressing toward the main plate than the shroud curved plate portion are pressed toward the main plate. Especially, in this aspect, since the shroud flat surfaces are arranged opposite to the portions, which are included in the main plate and to which the ultrasonic vibration is given, in the direction of the rotational axis, the portions of the shroud that most need to be pressed toward the main plate can be appropriately pressed.

As a result, the shroud can be appropriately pressed toward the main plate in welding between the main plate-side blade axial ends and the main plate in this aspect.

A method for manufacturing an impeller of a centrifugal fan according to an eighteenth aspect is the method for manufacturing the impeller of the centrifugal fan according to any of the tenth to seventeenth aspects, wherein in welding between the main plate-side blade axial ends and the main plate, in a state in which gaps between blade rear edge-side portions of the main plate-side blade axial ends and the main plate are secured, the ultrasonic vibration is given to the blades and the main plate from portions of the main plate that are located on the front edge side of the blades with respect to the gaps.

When the main plate-side blade axial ends and the main plate are welded together by giving the ultrasonic vibration to the blades and the main plate, the main plate-side welded portions are formed. In this case, however, the ultrasonic vibration may be transferred also to portions arranged on the rear edge side of the blades with respect to the main plate-side welded portions, and the portions may be also weakly welded. If the portions arranged on the rear edge side of the blades with respect to the main plate-side welded portions are weakly welded, the weakly welded portions may be removed during the operation of the centrifugal fan and may cause abnormal noise.

In this aspect, as described above, in welding between the main plate-side blade axial ends and the main plate, in the state in which the gaps between the blade rear edge-side portions of the main plate-side blade axial ends and the main plate are secured, the ultrasonic vibration is given to the blades and the main plate from the portions of the main plate that are located on the front edge side of the blades with respect to the gaps.

This makes it possible to reduce the probability that the portions arranged on the rear edge side of the blades with respect to the main plate-side welded portions are weakly welded and to decrease the occurrence of abnormal noise during the operation of the centrifugal fan.

An apparatus for manufacturing an impeller of a centrifugal fan according to a nineteenth aspect is an apparatus for manufacturing an impeller of a centrifugal fan, the impeller being manufactured by welding between multiple blades arranged annularly around a rotational axis and a main plate and a shroud, the main plate and the shroud being respectively arranged opposite two blade axial ends that are ends of each of the blades in the direction of the rotational axis. The apparatus for manufacturing the impeller of the centrifugal fan includes: a main plate-side ultrasonic horn that gives ultrasonic vibration to each of the blades and the main plate to weld between the main plate and a main plate-side blade axial end that is one of the two blade axial ends of each of the blades; and a shroud-side ultrasonic horn that gives ultrasonic vibration to each of the blades and the shroud to weld between the shroud and a shroud-side blade axial end that is the other of the two blade axial ends of each of the blades. In this aspect, the main plate-side ultrasonic horn includes main plate-side insertion portions that are inserted through the main plate to a portion of the main plate-side blade axial end, while the shroud-side ultrasonic horn includes shroud-side insertion portions that are inserted through the shroud to a portion of the shroud-side blade axial end.

To inexpensively manufacture the impeller of the centrifugal fan by welding between the multiple blades arranged annularly around the rotational axis and the main plate and the shroud arranged opposite to two blade axial ends that are both ends of each of the blades in the direction of the rotational axis, it is necessary to reduce molds to be used and molding processes for forming, in advance, edges, through-holes, and protrusions that are required for welding, make smaller the areas of welded portions, and downsize ultrasonic horns and an ultrasonic oscillator to be included.

In this aspect, as described above, the main plate-side ultrasonic horn, which gives the ultrasonic vibration to the blades and the main plate to weld between the main plate-side blade axial ends and the main plate, includes the main plate-side insertion portions that are inserted through the main plate to the portions of the main plate-side blade axial ends. In addition, the shroud-side ultrasonic horn, which gives the ultrasonic vibration to the blades and the shroud to weld between the shroud-side blade axial ends and the shroud, includes the shroud-side insertion portions that are inserted through the shroud to the portions of the shroud-side blade axial ends. The main plate-side ultrasonic horn having the main plate-side insertion portions gives the ultrasonic vibration to the blades and the main plate, melts the main plate-side blade axial ends and the main plate so that main plate-side welding holes that are recesses extending through the main plate to portions of the main plate-side blade axial ends are formed, and forms main plate-side welded portions having the main plate-side welding holes. In addition, the shroud-side ultrasonic horn having the shroud-side insertion portions gives the ultrasonic vibration to the blades and the shroud, melts the shroud-side blade axial ends and the shroud so that shroud-side welding holes that are recesses extending through the shroud to portions of the shroud-side blade axial ends are formed, and forms shroud-side welded portions having the shroud-side welding holes. In the case where the welded portions having the welding holes are formed, it is possible to reduce the molds and molding processes for forming, in advance, the edges, through-holes, and protrusions that are required for the conventional ultrasonic welding, and make smaller the areas of the welded portions. When the areas of the welded portions are reduced, it is possible to downsize the ultrasonic horns and reduce output of the ultrasonic oscillator.

In this aspect, it is possible to inexpensively manufacture the impeller of the centrifugal fan by welding between the multiple blades arranged annularly around the rotational axis and the main plate and the shroud arranged opposite to two blade axial ends that are both ends of each of the blades in the direction of the rotational axis.

An apparatus for manufacturing an impeller of a centrifugal fan according to a twentieth aspect is the apparatus for manufacturing the impeller of the centrifugal fan according to the nineteenth aspect, wherein the main plate-side ultrasonic horn includes the multiple main plate-side insertion portions extending in the blade longitudinal directions of the main plate-side blade axial ends, and the shroud-side ultrasonic horn includes the multiple shroud-side insertion portions extending in the blade longitudinal directions of the shroud-side blade axial ends.

In this aspect, it is possible to strongly weld between the main plate-side blade axial ends and the main plate and between the shroud-side blade axial ends and the shroud.

An apparatus for manufacturing an impeller of a centrifugal fan according to a twenty-first aspect is the apparatus for manufacturing the impeller of the centrifugal fan according to the nineteenth or twentieth aspect, wherein the main plate-side ultrasonic horn and the shroud-side ultrasonic horn are included to weld between any of the multiple blades and the main plate and the shroud. The apparatus for manufacturing the impeller of the centrifugal fan further includes an impeller supporting device that supports the main plate, the multiple blades, and the shroud rotatably around the rotational axis, so as to align one of the blades with respect to the main plate-side ultrasonic horn and the shroud-side ultrasonic horn.

In this aspect, the welding between each of the main plate-side blade axial ends and the main plate and the welding between each of the shroud-side blade axial ends and the shroud can be conducted sequentially for each of the multiple blades.

This makes it possible, in this aspect, to further downsize the ultrasonic horns and further reduce the output of the ultrasonic oscillator, compared with the case where a large ultrasonic horn having a size sufficient to cover the entire main plate and the entire shroud is used to collectively weld the multiple blades.

An apparatus for manufacturing an impeller of a centrifugal fan according to a twenty-second aspect is the apparatus for manufacturing the impeller of the centrifugal fan according to any of the nineteenth to twenty-first aspects, and further includes shroud pressing device that presses the shroud toward the main plate in welding between the main plate-side blade axial ends and the main plate using the main plate-side ultrasonic horn.

In welding between the main plate-side blade axial ends and the main plate, in the case where the ultrasonic vibration is given to the blades and the main plate from the main plate side, the main plate is pressed toward the shroud using the main plate-side ultrasonic horn.

In this aspect, the shroud pressing device described above is included.

As a result, the shroud can be pressed toward the main plate and receive a pressing force using the main plate-side ultrasonic horn from the main plate side, in welding between the main plate-side blade axial ends and the main plate in this aspect.

An apparatus for manufacturing an impeller of a centrifugal fan according to a twenty-third aspect is the apparatus for manufacturing the impeller of the centrifugal fan according to the twenty-second aspect, wherein the shroud pressing device presses portions of the shroud toward the main plate, the portions being, in the direction of the rotational axis, opposite to portions where the main plate-side insertion portions are inserted into the main plate and the main plate-side blade axial ends.

In this aspect, in welding between the main plate-side blade axial ends and the main plate, the portions of the shroud that most need to be pressed toward the main plate can be appropriately pressed.

An apparatus for manufacturing an impeller of a centrifugal fan according to a twenty-fourth aspect is the apparatus for manufacturing the impeller of the centrifugal fan according to any of the nineteenth to twenty-third aspects, and further includes a non-welding device that deflects and deforms the main plate to secure gaps between blade rear edge-side portions of the main plate-side blade axial ends and portions of the main plate that are located on the rear edge side of the blades with respect to the portions where the main plate-side insertion portions are inserted into the main plate and the main plate-side blade axial ends, in welding between the main plate-side blade axial ends and the main plate using the main plate-side ultrasonic horn.

When the main plate-side blade axial ends and the main plate are welded together by giving the ultrasonic vibration to the blades and the main plate, the main plate-side welded portions are formed on the portions where the main plate-side insertion portions of the main plate-side ultrasonic horn are inserted. In this case, the ultrasonic vibration may be transferred also to portions arranged on the rear edge side of the blades with respect to the main plate-side welded portions, and the portions may be also weakly welded. If the portions arranged on the rear edge side of the blades with respect to the main plate-side welded portions are weakly welded, the weakly welded portions may be removed during the operation of the centrifugal fan and may cause abnormal noise.

In this aspect, as described above, in welding between the main plate-side blade axial ends and the main plate, in a state in which the gaps between the blade rear edge-side portions of the main plate-side blade axial ends and the main plate are secured by deflecting and deforming the main plate using the non-welding device, the ultrasonic vibration is given to the blades and the main plate from portions of the main plate that are located on the front edge side of the blades with respect to the gaps.

This makes it possible to reduce the probability that the portions arranged on the rear edge side of the blades with respect to the main plate-side welded portions are weakly welded and to decrease the occurrence of abnormal noise during the operation of the centrifugal fan.

DESCRIPTION OF EMBODIMENTS

Hereinafter, an embodiment of an impeller of a centrifugal fan and a method and apparatus for manufacturing the impeller pertaining to the present invention is described with reference to the accompanying drawings. Note that specific configurations described in the embodiment of the impeller of the centrifugal fan and the method and apparatus for manufacturing the impeller pertaining to the present invention are not limited to the following embodiment and its modified examples, and may be changed within the gist of the present invention.

(1) Entire Configuration of Air Conditioner

Figure 1:
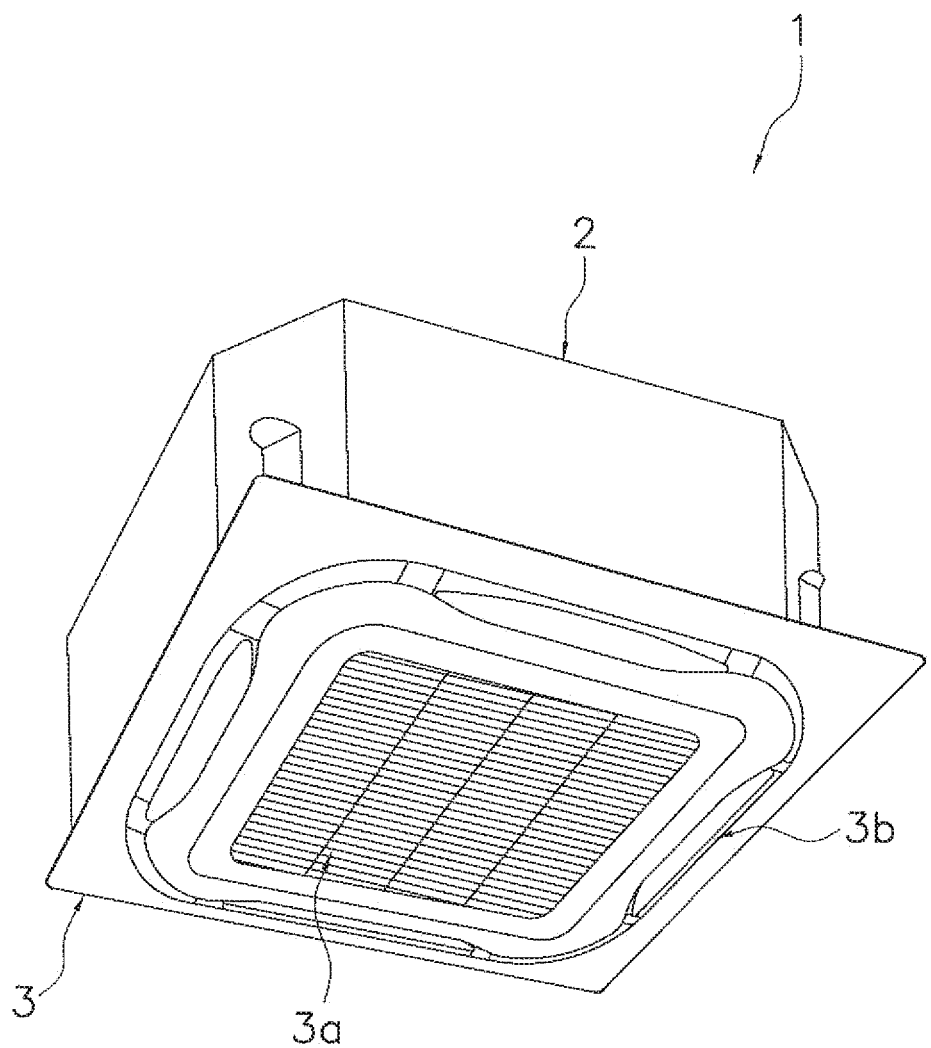
FIG. 1 is a perspective diagram of an air conditioner which uses a centrifugal fan having an impeller according to an embodiment of the present invention.

FIG. 1 is a perspective view (omitting a ceiling) of an air conditioner 1 in which a centrifugal fan 4 having an impeller 8 according to the embodiment of the present invention is used. The air conditioner 1 is a ceiling-mounted air conditioner and mainly includes a casing 2 storing various constituent devices therein and a laminate panel 3 installed on the lower side of the casing 2.

Figure 2:
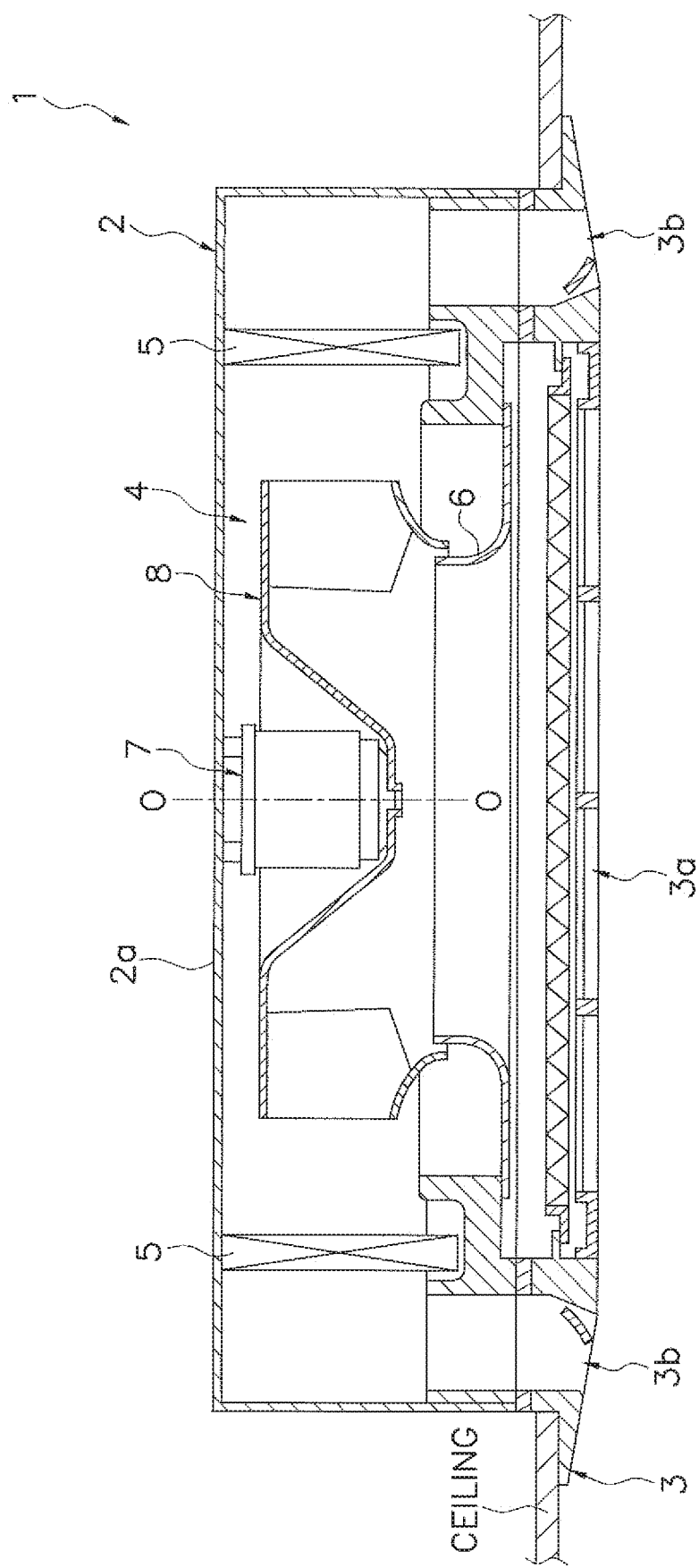
FIG. 2 is a schematic cross-sectional side view of the air conditioner.

The casing 2 of the air conditioner 1 is a box-shaped member having an opening on its lower surface and is installed and located in an opening portion of a ceiling of an air-conditioned room, as shown in FIG. 2 (schematic cross-sectional side view of the air conditioner 1). The laminate panel 3 has an inlet 3a arranged at a substantially central portion of the casing 2 to suck air within the air-conditioned room into the casing 2, and an outlet 3b arranged to surround an outer circumference of the inlet 3a for blowing out the air from the casing 2 to the air-conditioned room, the laminate panel 3 also being arranged to fit with the opening portion of the ceiling.

In the casing 2, the centrifugal fan 4 that sucks air within the air-conditioned room into the casing 2 via the inlet 3a of the laminate panel 3 and blows out the air in an outer circumferential direction, a thermal exchanger 5 surrounding an outer circumference of the centrifugal fan 4, and a bell-mouth 6 that guides the air sucked through the inlet 3a to the centrifugal fan 4 are located. The centrifugal fan 4 includes a fan motor 7 installed at a substantially central portion of a top plate 2a of the casing 2, and the impeller 8 coupled to the fan motor 7 so as to be rotatably driven.

Note that the air conditioner 1 provided with the centrifugal fan 4 is not limited to the ceiling-mounted type and may be of another type. A configuration of the impeller 8, a method for manufacturing the impeller 8, and an apparatus for manufacturing the impeller 8 are described below.

(2) Configuration of Impeller

Figure 3:
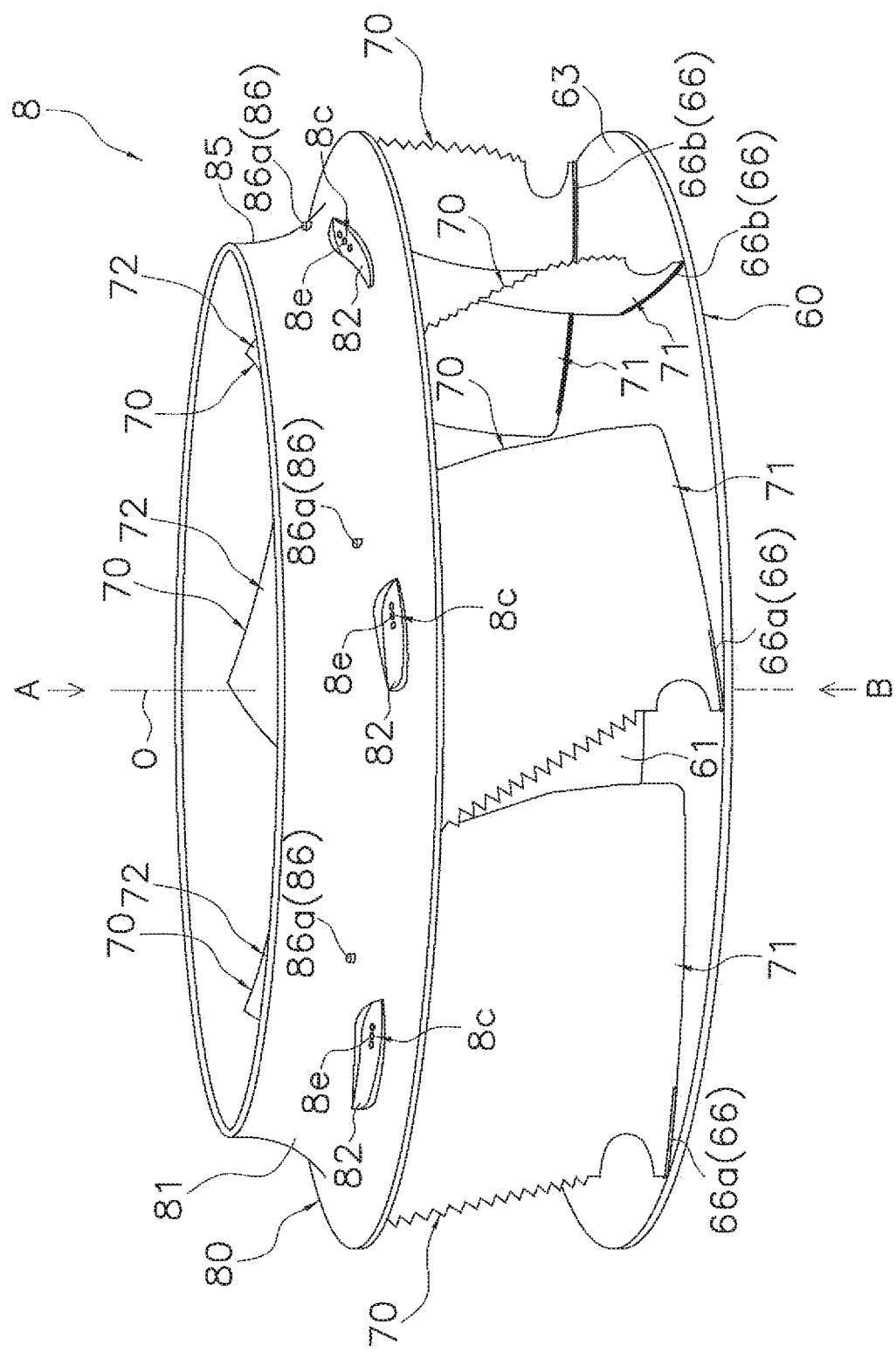
FIG. 3 is a perspective view of the impeller.
Figure 4:
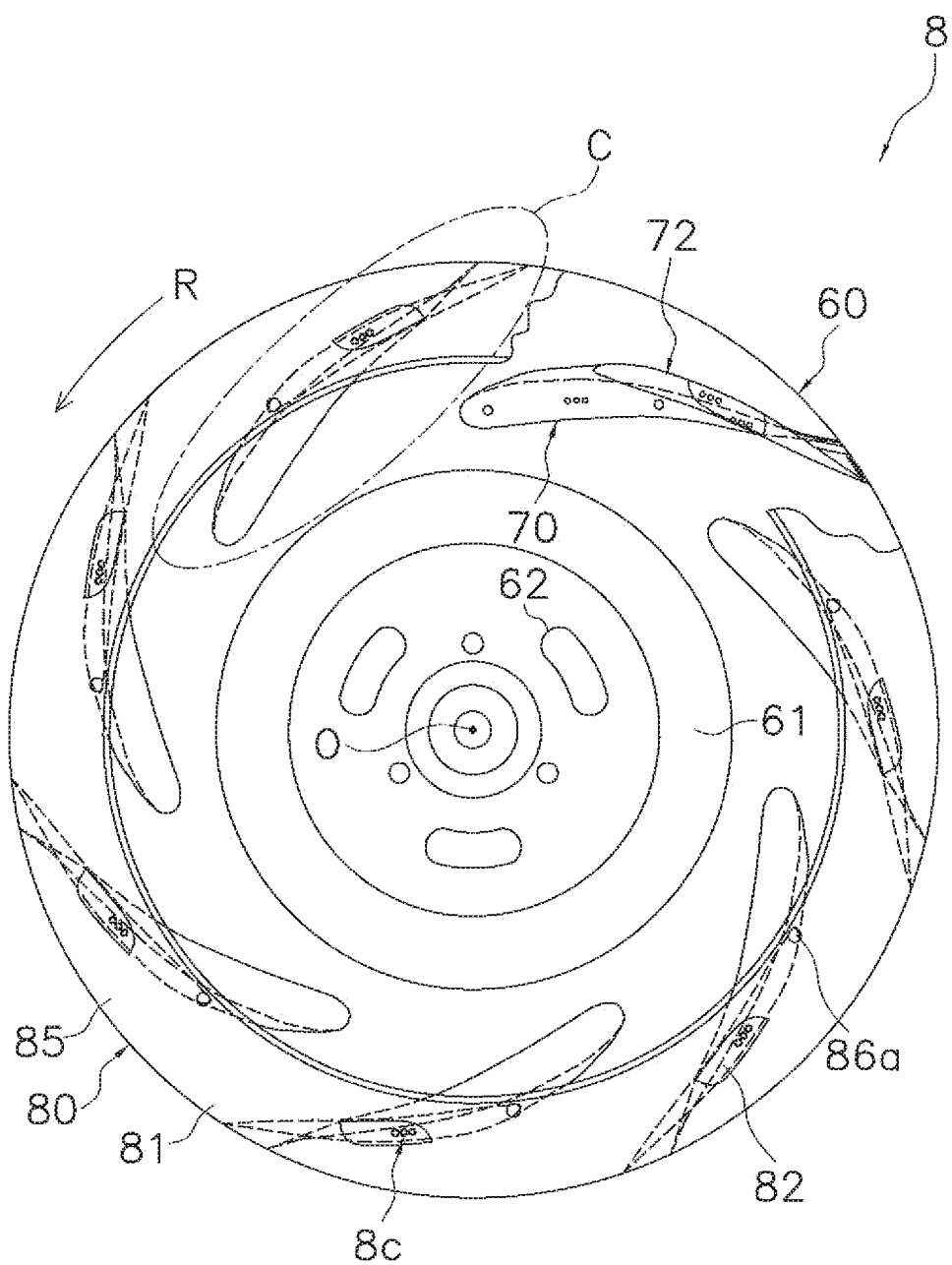
FIG. 4 is a diagram (excluding a portion of a shroud) when viewed from an arrow A shown in FIG. 3.
Figure 5:
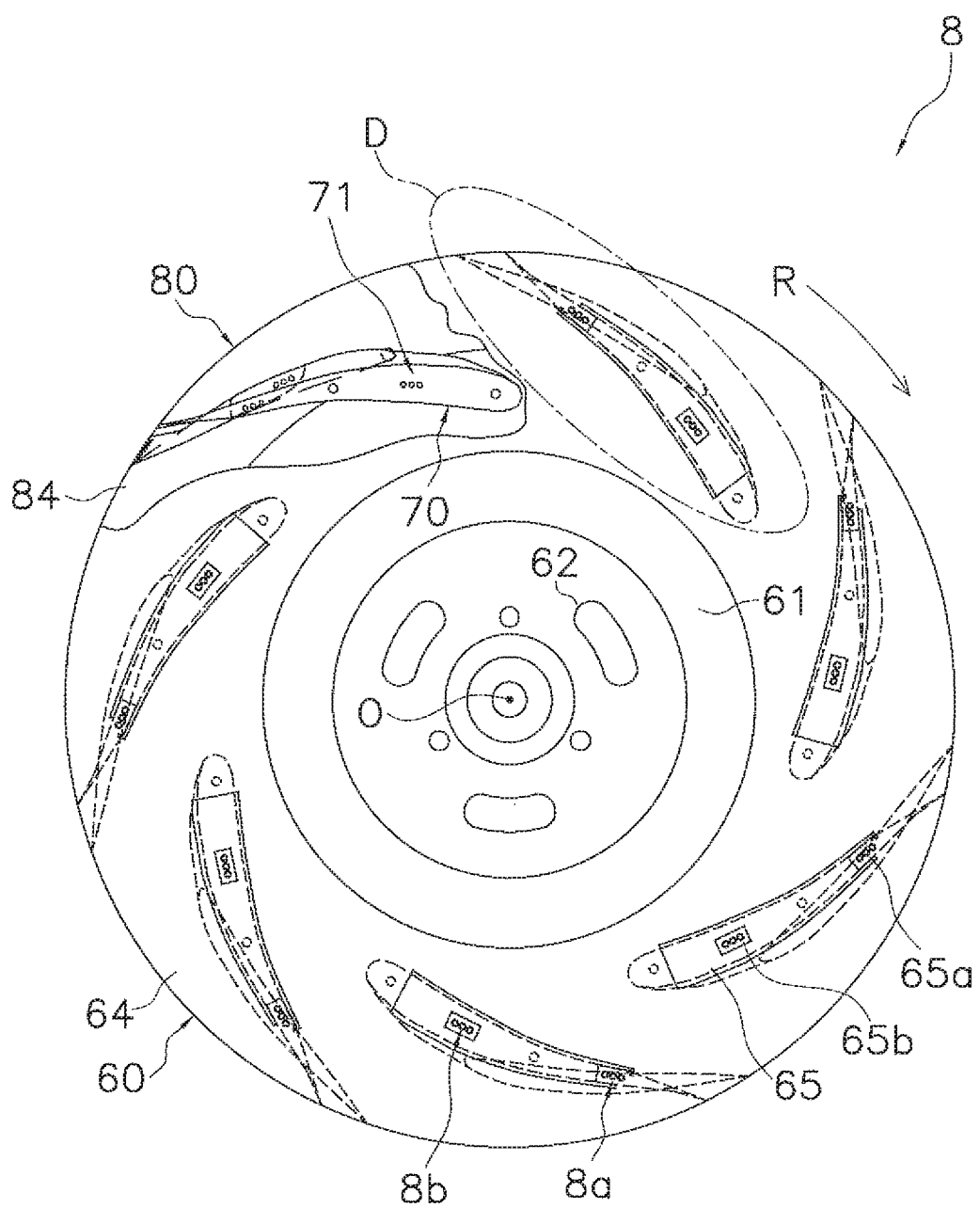
FIG. 5 is a diagram (excluding a portion of a main plate) when viewed from an arrow B shown in FIG. 3.
Figure 6:
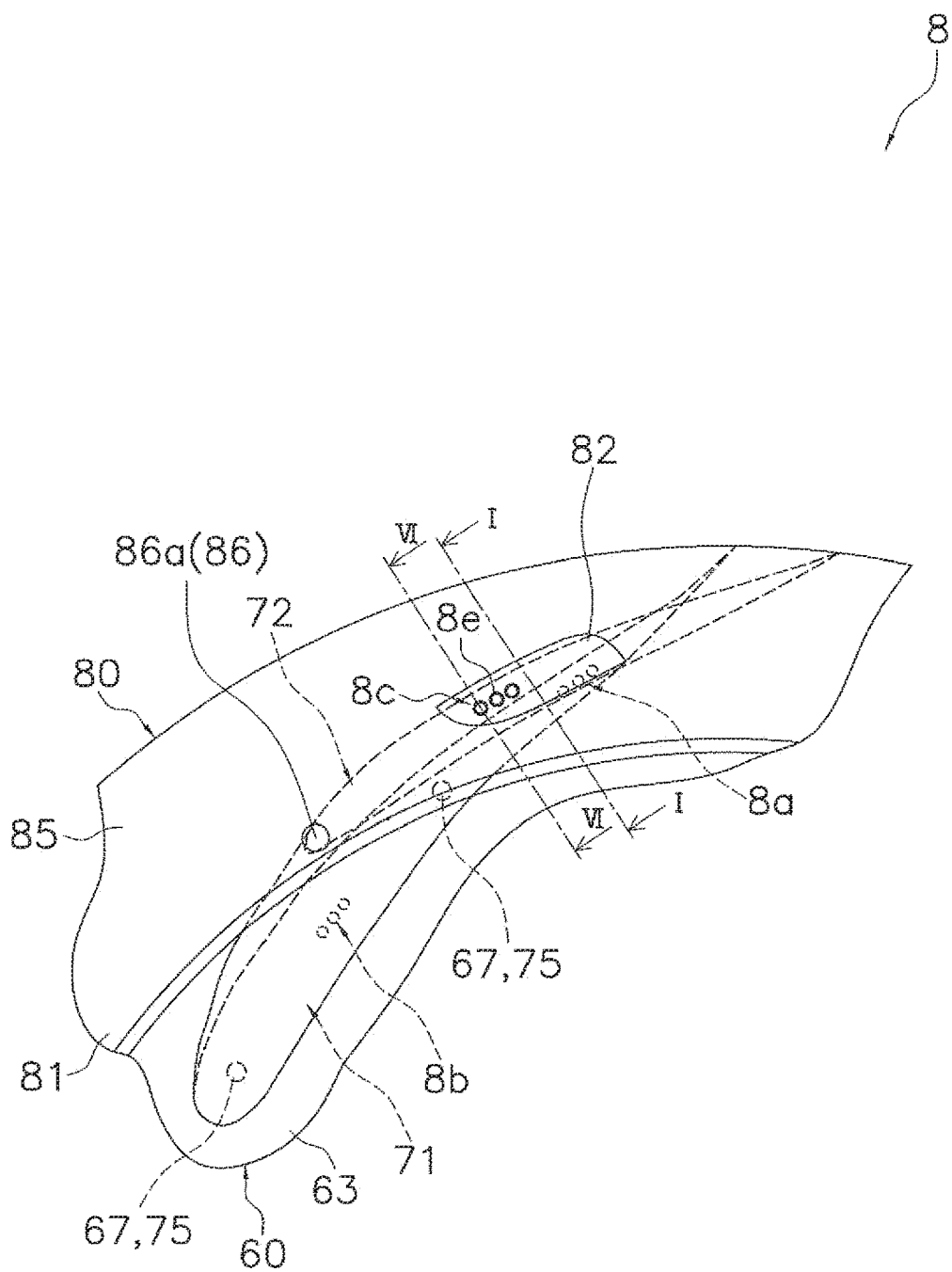
FIG. 6 is an enlarged view of a portion indicated by C in FIG. 4.
Figure 7:
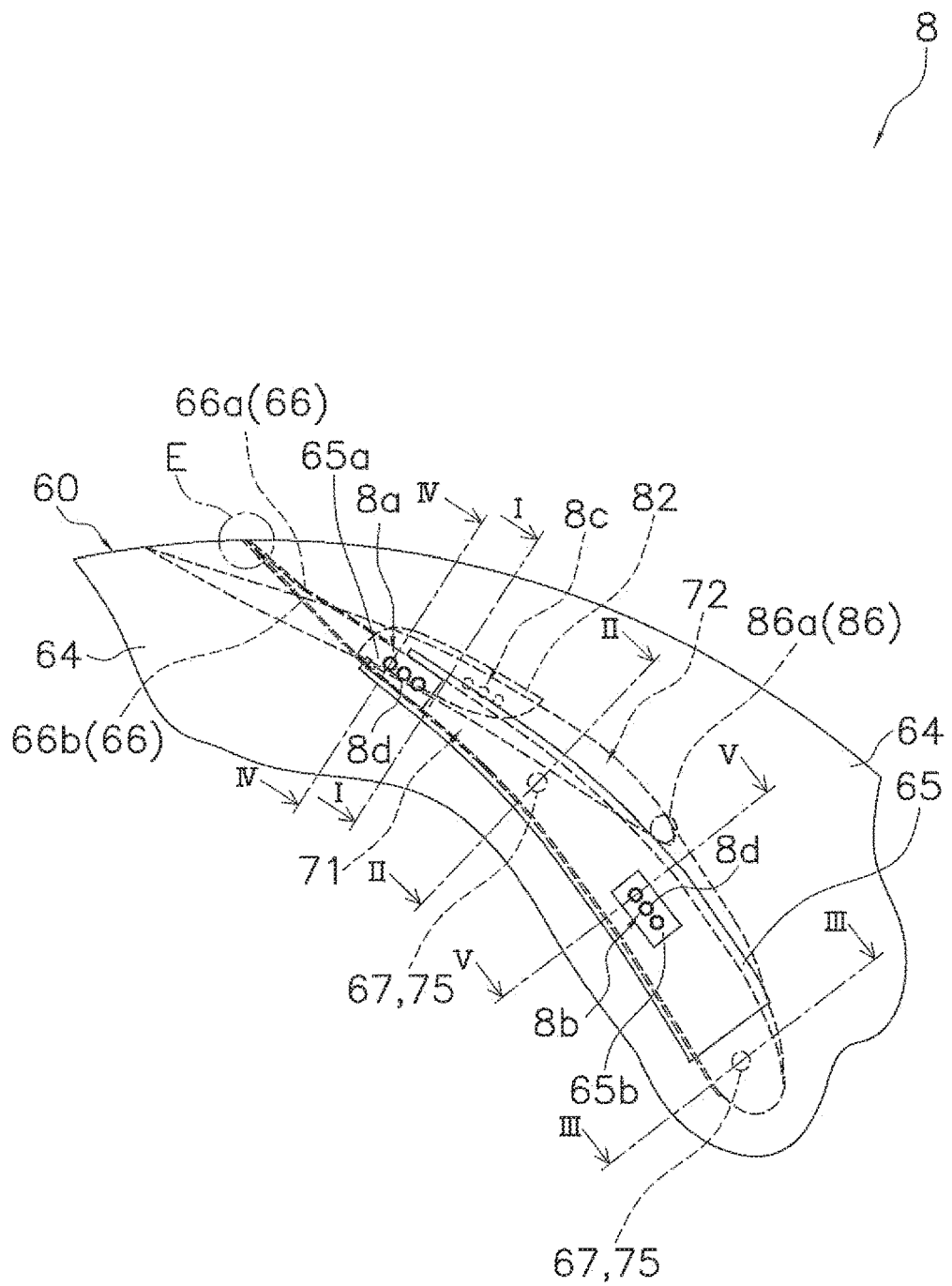
FIG. 7 is an enlarged view of a portion indicated by D in FIG. 5.
Figure 8:
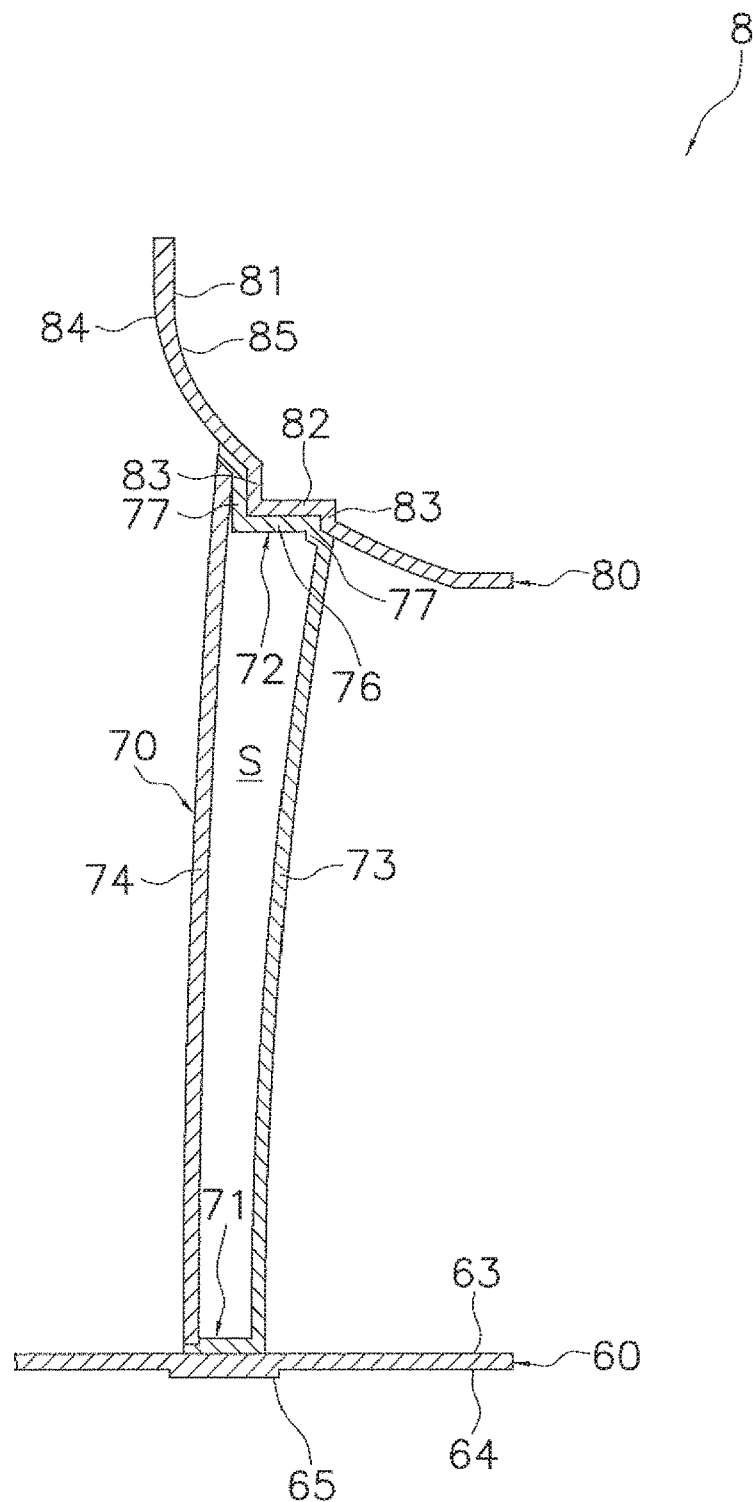
FIG. 8 is a diagram showing a cross-section taken along lines I-I shown in FIGS. 6 and 7.
Figure 9:
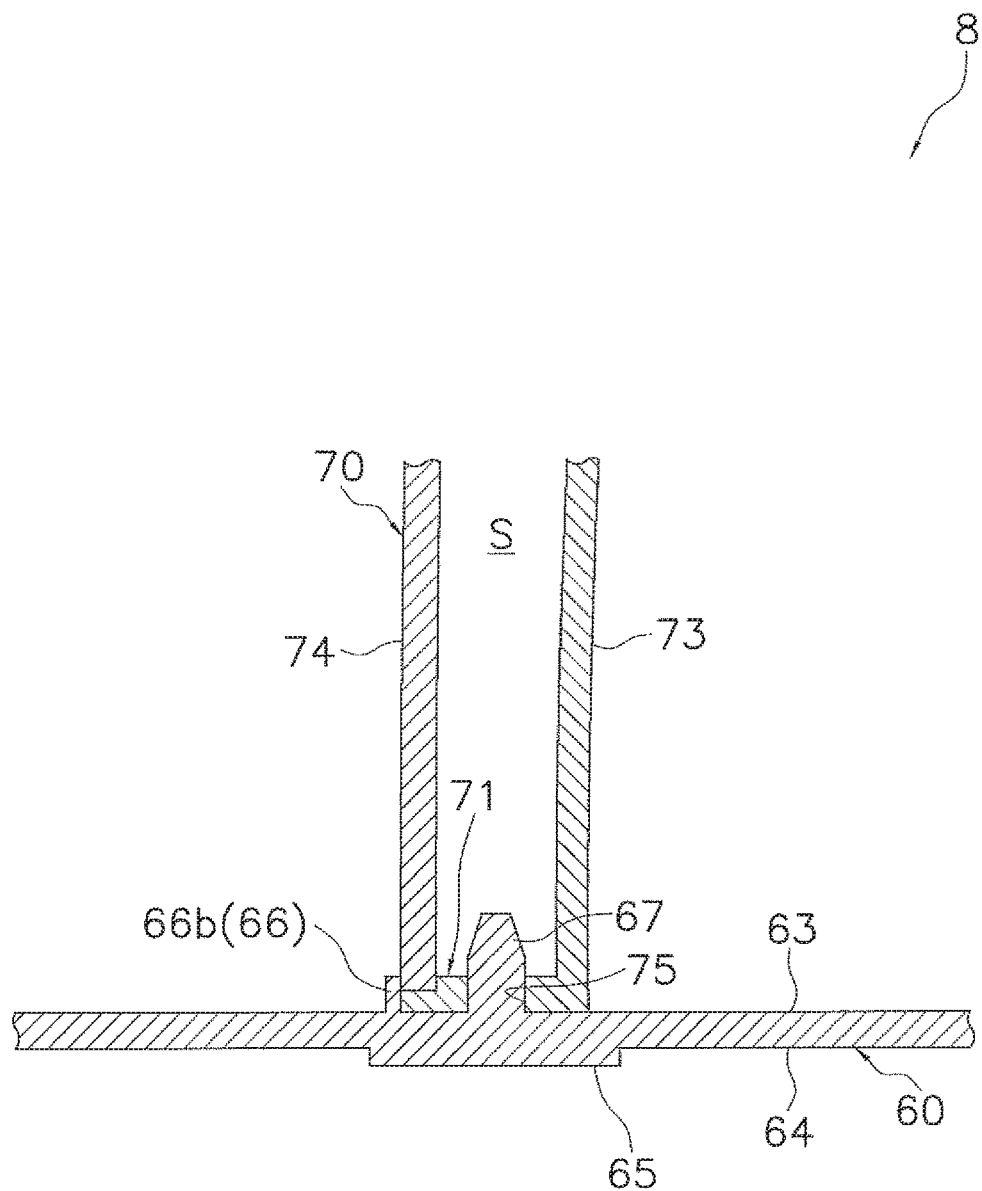
FIG. 9 is a diagram showing a cross-section taken along lines II-II and III-III shown in FIG. 7.
Figure 10:
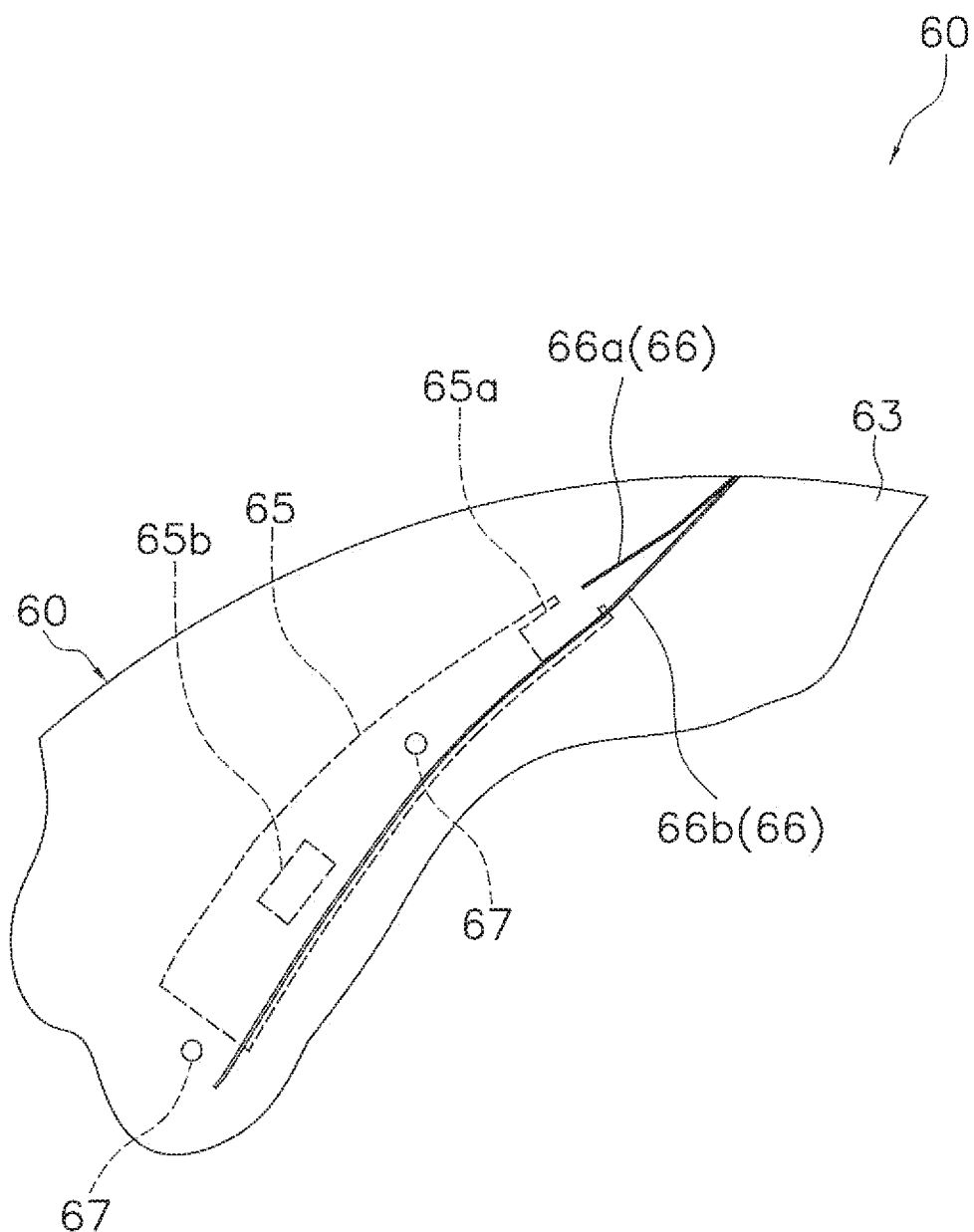
FIG. 10 is a diagram showing a portion of the main plate when viewed from the blades in the direction of a rotational axis.
Figure 11:
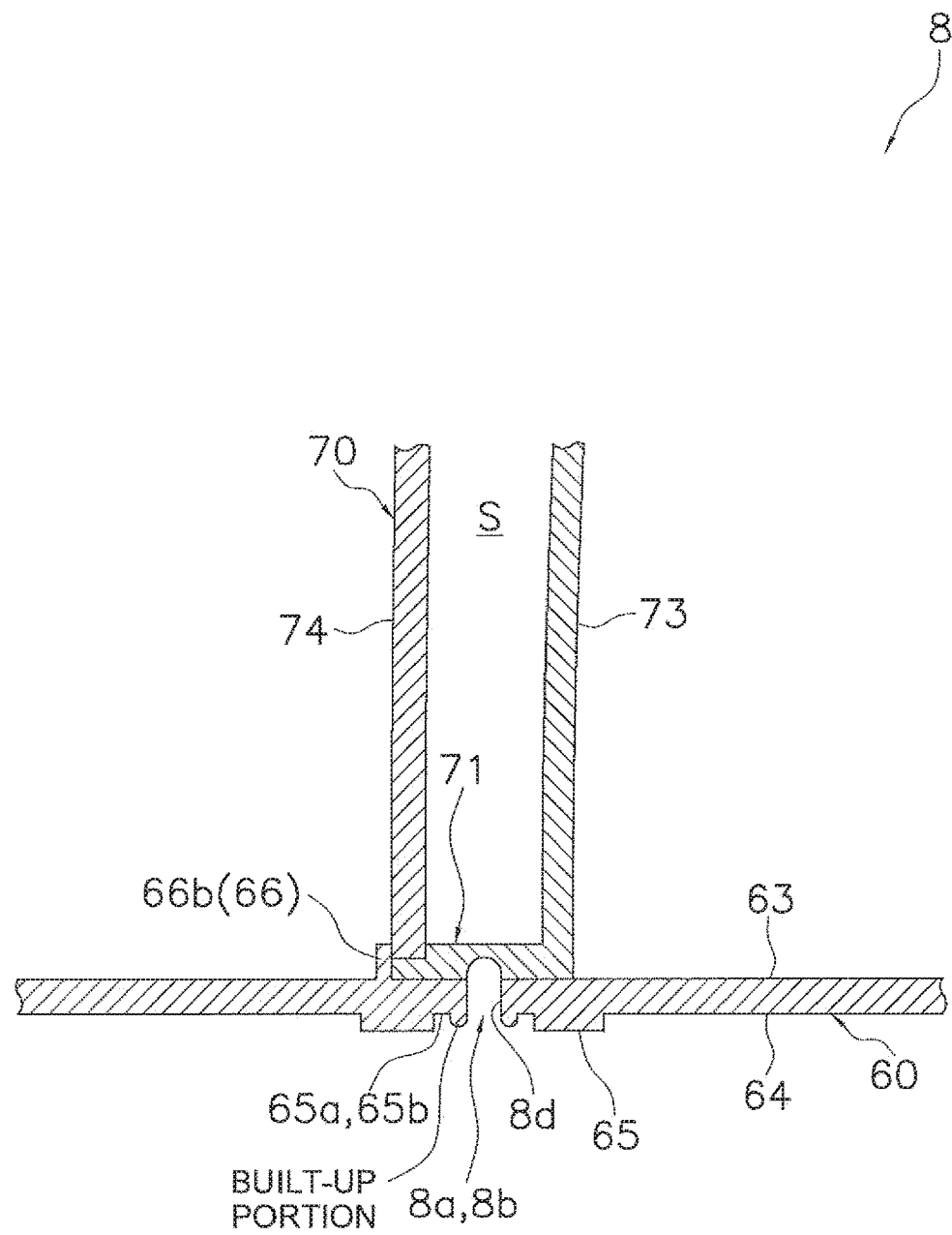
FIG. 11 is a diagram showing a cross-section taken along lines IV-IV and V-V shown in FIG. 7.
Figure 12:
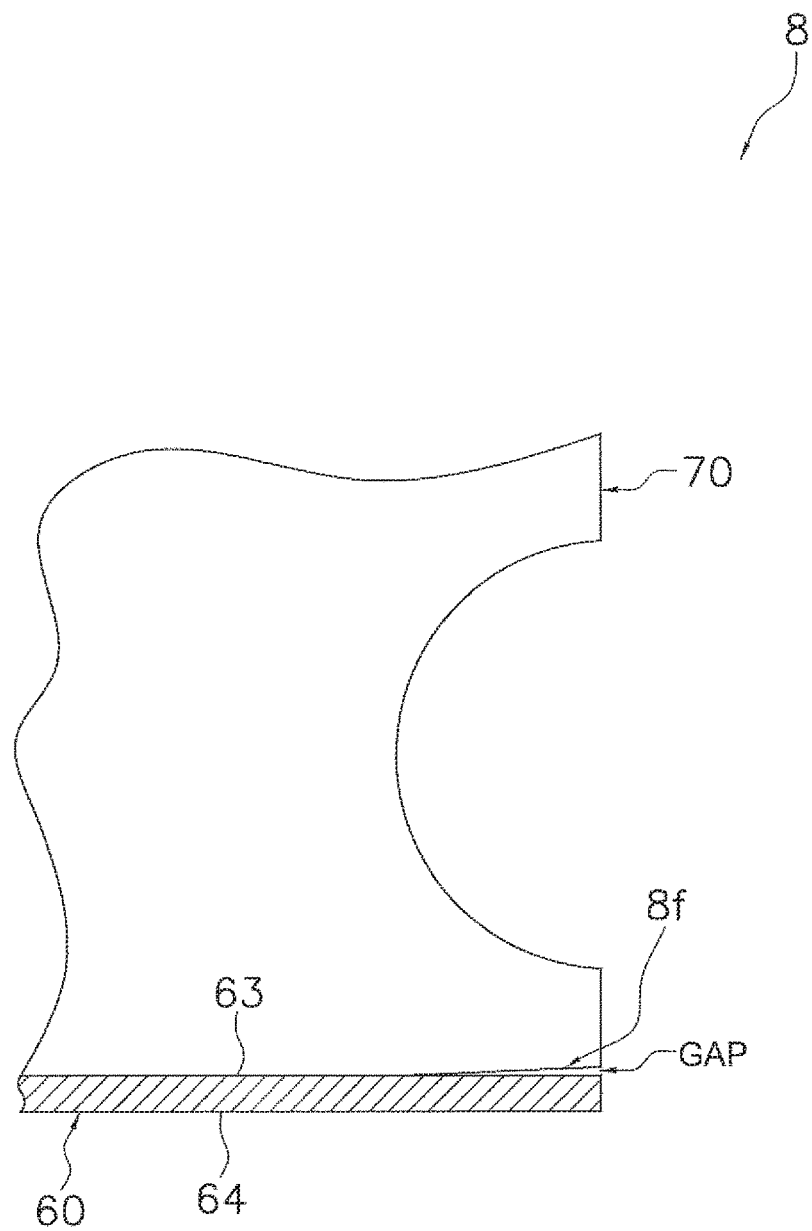
FIG. 12 is an enlarged cross-sectional diagram showing a portion indicated by E in FIG. 7 when viewed from a positive pressure surface.
Figure 13:
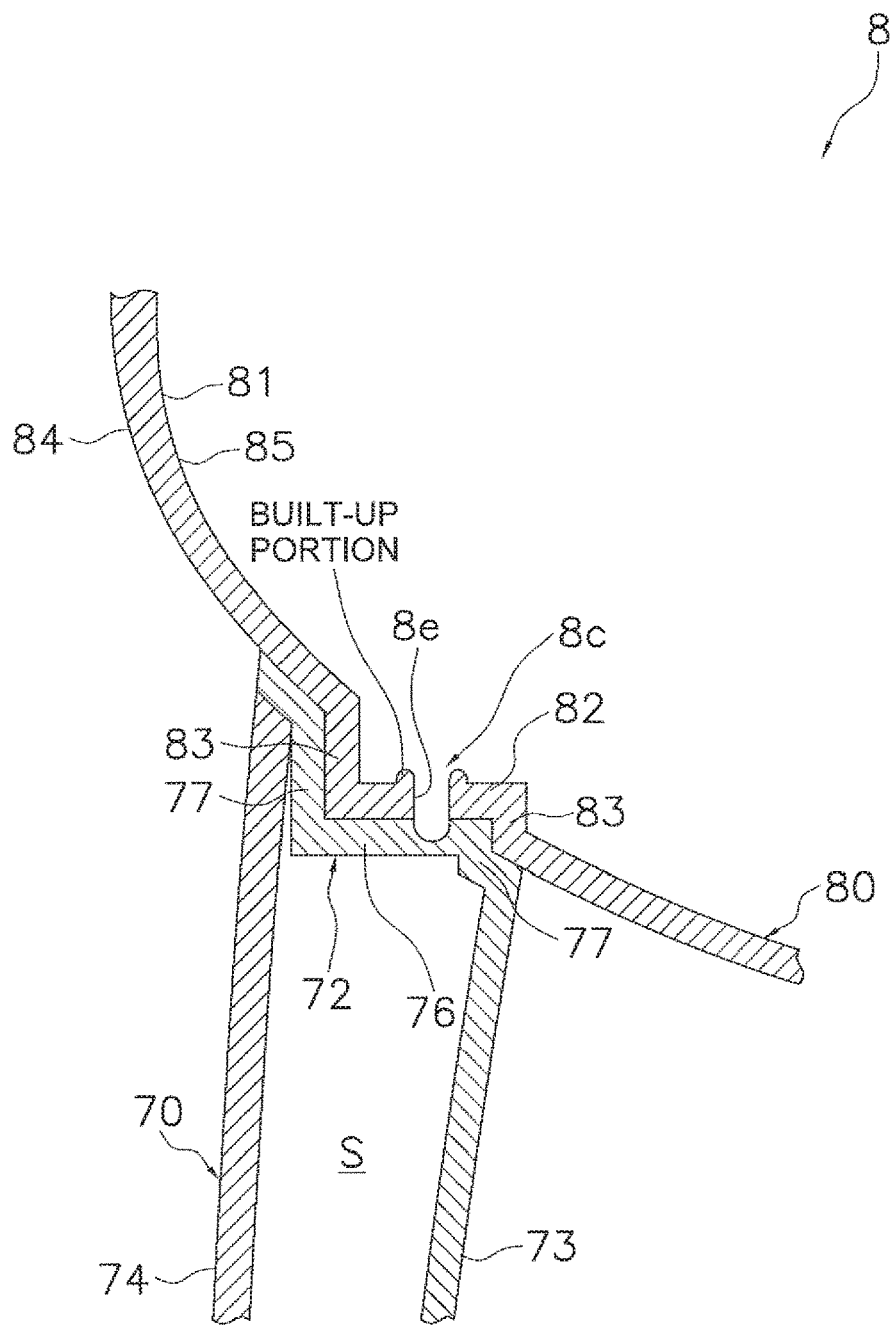
FIG. 13 is a diagram showing a cross-section taken along a line VI-VI shown in FIG. 6.

Next, the configuration of the impeller 8 is described using FIGS. 3 to 13. FIG. 3 is a perspective view of the impeller 8. FIG. 4 is a diagram (excluding a portion of a shroud 80) when viewed from an arrow A shown in FIG. 3. FIG. 5 is a diagram (excluding a portion of a main plate 60) when viewed from an arrow B shown in FIG. 3. FIG. 6 is an enlarged view of a portion indicated by C in FIG. 4. FIG. 7 is an enlarged view of a portion indicated by D shown in FIG. 5. FIG. 8 is a diagram showing a cross-section taken along lines I-I shown in FIGS. 6 and 7. FIG. 9 is a diagram showing a cross-section taken along lines II-II and III-III shown in FIG. 7. FIG. 10 is a diagram showing a portion of the main plate 60 when viewed from blades 70 in the direction of a rotational axis O. FIG. 11 is a diagram showing a cross-section taken along lines IV-IV and V-V shown in FIG. 7. FIG. 12 is an enlarged cross-sectional diagram showing a portion indicated by E in FIG. 7 when viewed from a positive pressure surface. FIG. 13 is a diagram showing a cross-section taken along a line VI-VI shown in FIG. 6.

The impeller 8 mainly includes the disk-shaped main plate 60 connectable to the fan motor 7, the multiple (seven in this embodiment) blades 70 arranged annularly around the rotational axis O of the main plate 60 on the opposite side to the fan motor 7 with respect to the main plate 60, and the annular shroud 80 arranged so that the multiple blades 70 are arranged between the shroud 80 and the main plate 60 in the direction of the rotational axis O. In this embodiment, a rotational direction of the impeller 8 is indicated by R.

The main plate 60 is a resin member formed so that a substantially conical hub portion 61 protrudes from a central portion of the main plate 60 toward the inlet 3a. The hub portion 61 includes multiple (three in this embodiment) cooling air holes 62, which are long holes located side by side in a concentric fashion of the main plate 60, and the like.

The shroud 80 is a bell-shaped resin member that extends, in a curve toward the inlet 3a, from its outer circumferential portion to its central opening. The resin member that constitutes the shroud 80 is not limited, but the same resin as that of the main plate 60 is used for the shroud 80 in this embodiment. The bell-shaped portion of the shroud 80 is referred to a shroud curved plate portion 81.

The blades 70 are resin members molded separately from the main plate 60 and the shroud 80. The resin members that constitute the blades 70 are not limited, but the same resin as those of the main plate 60 and the shroud 80 is used for the blades 70 in this embodiment. One ends of the blades 70 in the direction of the rotational axis O are main plate-side blade axial ends 71 arranged opposite to the main plate 60 and are fixed to the main plate 60. The other ends of the blades 70 in the direction of the rotational axis O are shroud-side blade axial ends 72 arranged opposite to the shroud 80 and are fixed to the shroud 80. The blades 70 each have a blade shape so that when the impeller 8 is viewed in the direction of the rotational axis O, the main plate-side blade axial ends 71 are inclined backward with respect to the shroud-side blade axial ends 72, and the main plate-side blade axial ends 71 and the shroud-side blade axial ends 72 intersect with each other. In other words, the blades 70 each have a three-dimensional blade shape extending in the direction of the rotational axis O while twisting between the main plate 60 and the shroud 80. The blades 70 are hollow blades that mainly include blade bodies 73 and blade lid bodies 74. The blade lid bodies 74 are engaged with and attached to the blade bodies 73 to create spaces S between the blade bodies 73 and the blade lid bodies 74, resulting in reduction in weights of the blades 70. Making each blade 70 hollow may not be achieved by the fit structure between the two members 73 and 74: instead, the hollow may be achieved by blow molding or the like. In this embodiment, each of blade rear edges of the blades 70 has an uneven shape to improve the performance of the centrifugal fan 4. Each of the blade rear edges of the blades 70, however, may not have the uneven shape when the centrifugal fan 4 has sufficient performance.

The main plate-side blade axial ends 71 of the blades 70 are fixed to the main plate 60 by welding between the main plate-side blade axial ends 71 and the main plate 60, and the welded portions between the main plate-side blade axial ends 71 and the main plate 60 form main plate-side welded portions 8a and 8b. The first main plate-side welded portions 8a are arranged to correspond to blade rear edge-side portions of the main plate-side blade axial ends 71 in blade longitudinal directions of the main plate-side blade axial ends 71, while the second main plate-side welded portions 8b are arranged to correspond to blade front edge-side portions of the main plate-side blade axial ends 71 in the blade longitudinal directions of the main plate-side blade axial ends 71. Each of the main plate-side welded portions 8a and 8b includes main plate-side welding holes 8d that are recesses extending through the main plate 60 to portions of the main plate-side blade axial ends 71. The multiple (three in this embodiment) main plate-side welding holes 8d are formed on each of the main plate-side welded portions 8a and 8b and arranged side by side in the blade longitudinal direction of each of the main plate-side blade axial ends 71. Note that the number of main plate-side welded portions 8a and 8b for each blade 70 is not limited to 2, while the number of main plate-side welding holes 8d for each of the main plate-side welded portions 8a and 8b is not limited to 3.

The main plate 60 has a blade-side main plate surface 63 arranged opposite to the main plate-side blade axial ends 71 and an opposite-blade-side main plate surface 64 that is an opposite surface of the blade-side main plate surface 63 in the direction of the rotational axis O. In this embodiment, protrusion-shaped opposite-blade-side main plate protrusions 65 are formed on the opposite-blade-side main plate surface 64 at positions corresponding to the main plate-side blade axial ends 71, recess-shaped opposite-blade-side main plate recesses 65a and 65b are formed on the opposite-blade-side main plate protrusions 65, and the blade-side welded portions 8a and 8b are arranged on the opposite-blade-side main plate recesses 65a and 65b. The first blade-side main plate recesses 65a are arranged to correspond to the first main plate-side welded portions 8a, while the second blade-side main plate recesses 65b are arranged to correspond to the second main plate-side welded portions 8b. Specifically, the thickness of portions in the main plate 60 corresponding to the main plate-side blade axial ends 71 is slightly larger than that of the rest portion of the main plate 60 around the portions corresponding to the main plate-side blade axial ends 71, but the slightly larger thickness is reduced at part of the main plate 60 corresponding to the main plate-side blade axial ends 71, so that the main plate-side welded portions 8a and 8b are arranged on the portions having the slightly smaller thicknesses. Thus, the main plate-side welded portions 8a and 8b are formed so that the main plate-side blade axial ends 71 and portions in the main plate 60 where the opposite-blade-side main plate recesses 65a and 65b are formed overlap each other in the direction of the rotational axis O and also the main plate-side welding holes 8d are formed on the overlapping portions to extend through the main plate 60 to the main plate-side blade axial ends 71.

Unwelded portions 8f that secure gaps between the main plate 60 and the main plate-side blade axial ends 71 are provided on the main plate-side blade axial ends 71 on the rear edge side of the blades of the blades 70 with respect to the first main plate-side welded portions 8a. In this embodiment, the unwelded portions 8f each have a shape that has a notch-like portion, at portions opposite to the blade-side main plate surface 63 in the blade rear edge-side portions of the main plate-side blade axial ends 71. Note that the unwelded portions 8f are not limited to the portions provided on the blade rear edge-side portions of the main plate-side blade axial ends 71. For example, the unwelded portions 8f may be provided each as a recess-like shape portion in the main plate 60, at portions opposite to the blade rear edge-side portions of the main plate-side blade axial ends 71 that are located in the outer circumferential portions of the main plate-side blade axial ends 71.

Weir portions 66 are provided along the blade rear edge-side portions of the main plate-side blade axial ends 71 on the main plate 60. The weir portions 66 are wall-shaped portions protruding from the blade-side main plate surface 63 of the main plate 60 toward the shroud 80 in the direction of the rotational axis O. The weir portions 66 each include a positive pressure surface-side weir portion 66a formed along the blade rear edge-side portions of the main plate-side blade axial ends 71 on the side of positive pressure surfaces of the blades 70; and a negative pressure surface-side weir portion 66b formed along the blade rear edge-side portions of the main plate-side blade axial ends 71 on the side of negative pressure surfaces of the blades 70. Note that although the negative pressure surface-side weir portions 66b are formed along not only the blade rear edge-side portions of the main plate-side blade axial ends 71 but also the blade front edge-side portions of the main plate-side blade axial ends 71 in this embodiment, the negative pressure surface-side weir portions 66b may be formed only along the blade rear edge-side portions of the main plate-side blade axial ends 71.

In addition, main plate protrusions 67 that protrude from the blade-side main plate surface 63 of the main plate 60 toward the shroud 80 in the direction of the rotational axis O are formed on portions of the main plate 60 that are arranged opposite to the main plate-side blade axial ends 71, and main plate-side blade holes 75 are formed on the main plate-side blade axial ends 71 so that the main plate protrusions 67 can be inserted into the main plate-side blade holes 75. Two pairs of the main plate protrusions 67 and the main plate-side blade holes 75 are arranged for each blade 70: one of the two pairs is arranged on the side of the blade front edge of the blade 70 with respect to the second main plate-side welded portion 8b, and the other pair is arranged between the first main plate-side welded portion 8a and the second main plate-side welded portion 8b in the blade longitudinal direction. In other words, the blades 70 are aligned at predetermined positions on the main plate 60 based on the main plate protrusions 67 and the main plate-side blade holes 75. Note that the number of pairs of the main plate protrusions 67 and the main plate-side blade holes 75 for each blade 70 is not limited to 2.

The shroud-side blade axial ends 72 of the blades 70 are fixed to the shroud 80 by welding between the shroud-side blade axial ends 72 and the shroud 80, as well as the fixing of the main plate-side blade axial ends 71 to the main plate 60, and the welded portions between the shroud-side blade axial ends 72 and the shroud 80 form shroud-side welded portions 8c. Shroud-side welding holes 8e that are recesses extending through the shroud 80 to the shroud-side blade axial ends 72 are formed on the shroud-side welded portions 8c, as in the main plate-side welded portions 8a and 8b. Multiple (three in this embodiment) shroud-side welding holes 8e are arranged side by side in the blade longitudinal direction of the shroud-side blade axial end 72, similarly to the main plate-side welding holes 8d. Note that the number of shroud-side welded portions 8c for each blade 70 is not limited to 1, while the number of shroud-side welding holes 8e for each blade 70 is not limited to 3.

Plate-shaped shroud flat plate portions 82 are formed on the shroud 80 at positions corresponding to the shroud-side blade axial ends 72. The shroud-side welded portions 8c are arranged on the shroud flat plate portions 82. Specifically, while most of the shroud 80 is constituted with the bell-shaped shroud curved plate portion 81, the plate-shaped shroud flat plate portions 82 that extend in a direction perpendicular to the direction of the rotational axis O are formed on portions included in the shroud curved plate portion 81 and corresponding to the shroud-side blade axial ends 72. Shroud-side blade flat plate portions 76 that extend in the direction perpendicular to the direction of the rotational axis O are formed on the shroud-side blade axial ends 72 of the blades 70 at positions corresponding to the shroud flat plate portions 82. Thus, the shroud-side welded portions 8c are formed so that the shroud flat plate portions 82 and the shroud-side blade flat plate portions 76 overlap each other in the direction of the rotational axis O and that the shroud-side welding holes 8e are formed on the overlapping portions and extend through the shroud-side flat plate portions 82 to the shroud-side blade flat plate portions 76.

In the embodiment, the shroud flat plate portions 82 are arranged to correspond to nearly central portions of the shroud-side blade axial ends 72 in the blade longitudinal directions of the shroud-side blade axial ends 72. Thus, the shroud-side blade flat plate portions 76 are also arranged on the nearly central portions of the shroud-side blade axial ends 72 in the blade longitudinal directions of the shroud-side blade axial ends 72.

The shroud flat plate portions 82 are arranged opposite to the first main plate-side welded portions 8a in the direction of the rotational axis O. Specifically, when the first main plate-side welded portions 8a are viewed in the direction of the rotational axis O, the shroud flat plate portions 82 are arranged at positions closest to the first main plate-side welded portions 8a among portions included in the shroud 80 and overlapping the shroud-side blade axial ends 72 in the direction of the rotational axis O, that is, are arranged at positions corresponding to the nearly central portions of the shroud-side blade axial ends 72 in the blade longitudinal directions of the shroud-side blade axial ends 72 in this embodiment. Note that, in this embodiment, the shroud flat plate portions 82 are arranged opposite to the first main plate-side welded portions 8a in the direction of the rotational axis O, but are not limited to this. The shroud flat plate portions 82 may be arranged opposite to the second main plate-side welded portions 8b in the direction of the rotational axis O, depending on the arrangement of the main plate-side welded portions 8a and 8b.

The shroud 80 has a blade-side shroud surface 84 arranged opposite to the shroud-side blade axial ends 72 and an opposite-blade-side shroud surface 85 that is an opposite surface of the blade-side shroud surface 84 in the direction of the rotational axis O. In this embodiment, shroud flat surfaces 86a are provided on the opposite-blade-side shroud surface 85 and arranged opposite to the second main plate-side welded portions 8b in the direction of the rotational axis O. Specifically, when the second main plate-side welded portions 8b are viewed in the direction of the rotational axis O, the shroud flat surfaces 86a are located at positions closest to the second main plate-side welded portions 8b among portions included in the shroud 80 and overlapping the shroud-side blade axial ends 72 in the direction of the rotational axis O, that is, are arranged at positions corresponding to the blade front edge-side portions of the shroud-side blade axial ends 72 in the blade longitudinal directions of the shroud-side blade axial ends 72. In this embodiment, the shroud flat surfaces 86a are end surfaces of shroud protrusions 86 in the direction of the rotational axis O, and are flat in the direction perpendicular to the rotational axis O, the shroud protrusions 86 being protruding in the direction of the rotational axis O from positions corresponding to the blade front edge-side portions of the shroud-side blade axial ends 72 in the shroud curved plate portion 81. Note that, in this embodiment, the shroud flat surfaces 86a are arranged opposite to the second main plate-side welded portions 8b in the direction of the rotational axis O, but are not limited to this. The shroud flat surfaces 86a may be arranged opposite to the first main plate-side welded portions 8a in the direction of the rotational axis O, depending on the arrangement of the main plate-side welded portions 8a and 8b.

Shroud stepped portions 83 that connect the shroud curved plate portion 81 to the shroud 80 are formed around the shroud flat plate portions 82 on the shroud 80, while blade stepped portions 77 that can he fit with the shroud stepped portions 83 are formed around the shroud-side blade flat plate portions 76 on the shroud-side blade axial ends 72, in a state in which the shroud flat plate portions 82 overlap the shroud-side blade flat plate portions 76 in the direction of the rotational axis O, the blade stepped portions 77 are configured to be fit with the shroud stepped portions 83. In other words, the blades 70 are aligned at predetermined positions on the shroud 80 based on the shroud stepped portions 83 and the blade stepped portions 77.

(3) Method and Apparatus for Manufacturing Impeller of Centrifugal Fan

Figure 14:
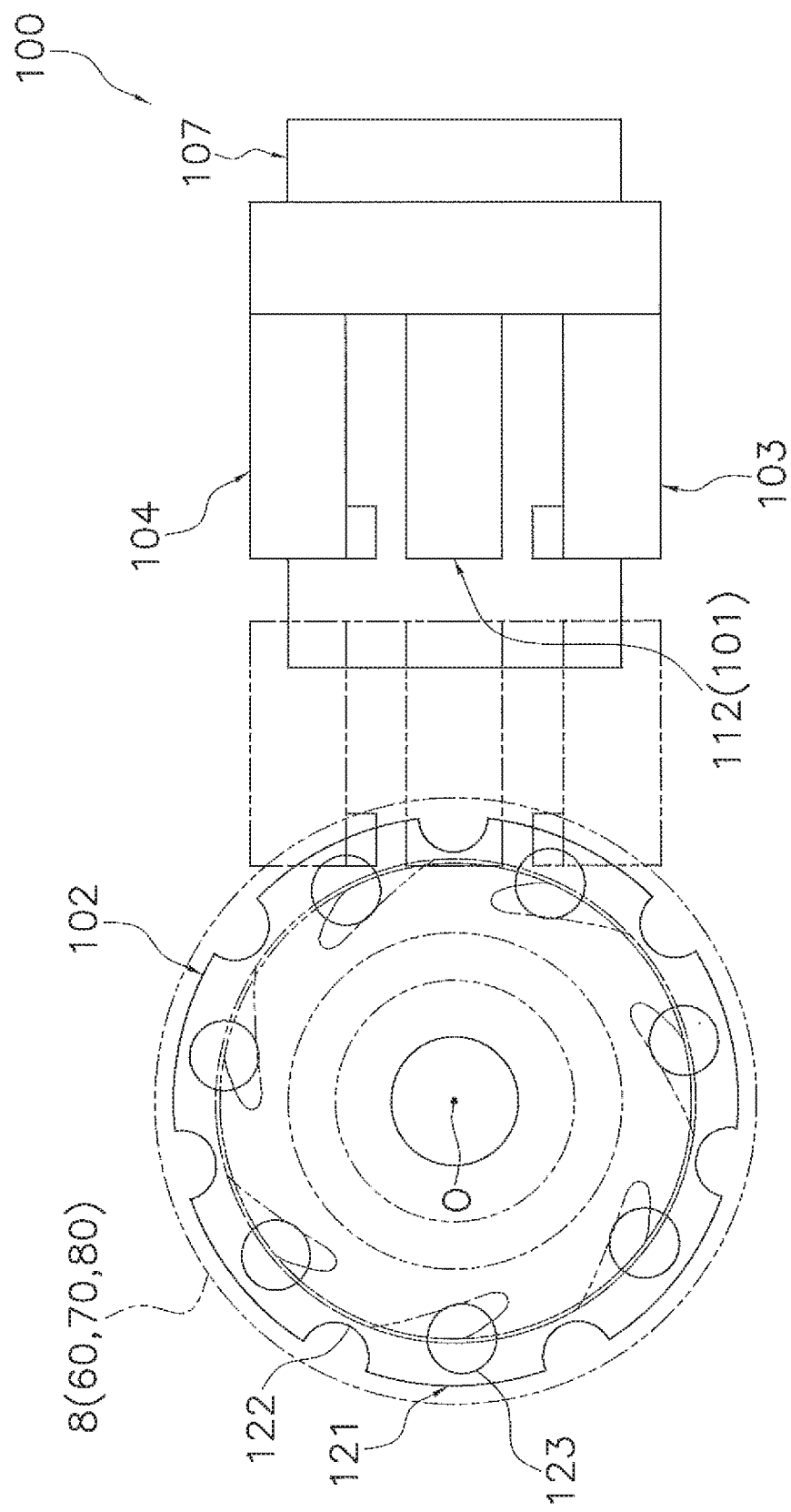
FIG. 14 is a schematic plan view of an apparatus for manufacturing the impeller.
Figure 15:
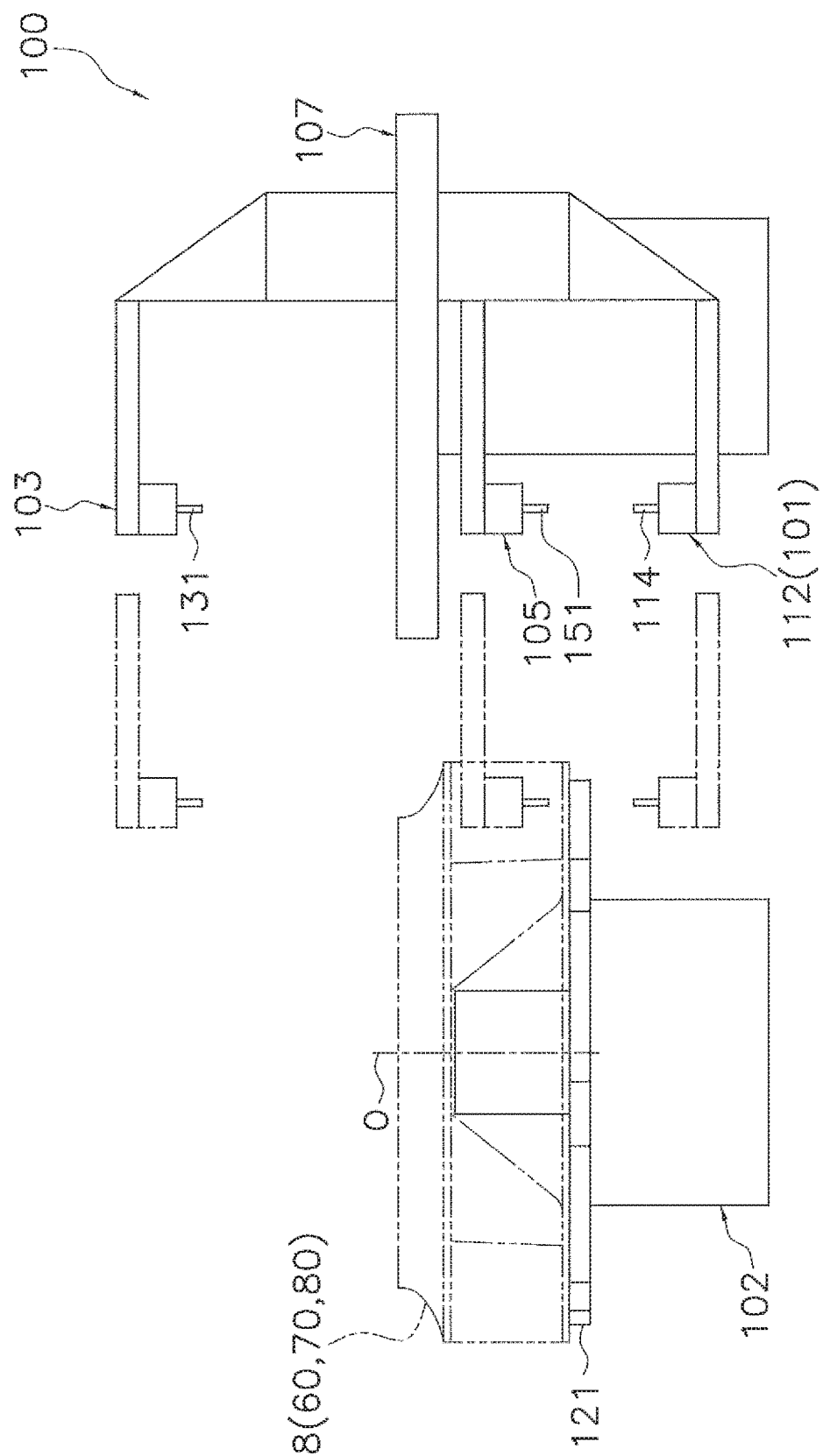
FIG. 15 is a schematic side view of the apparatus for manufacturing the impeller.
Figure 16:
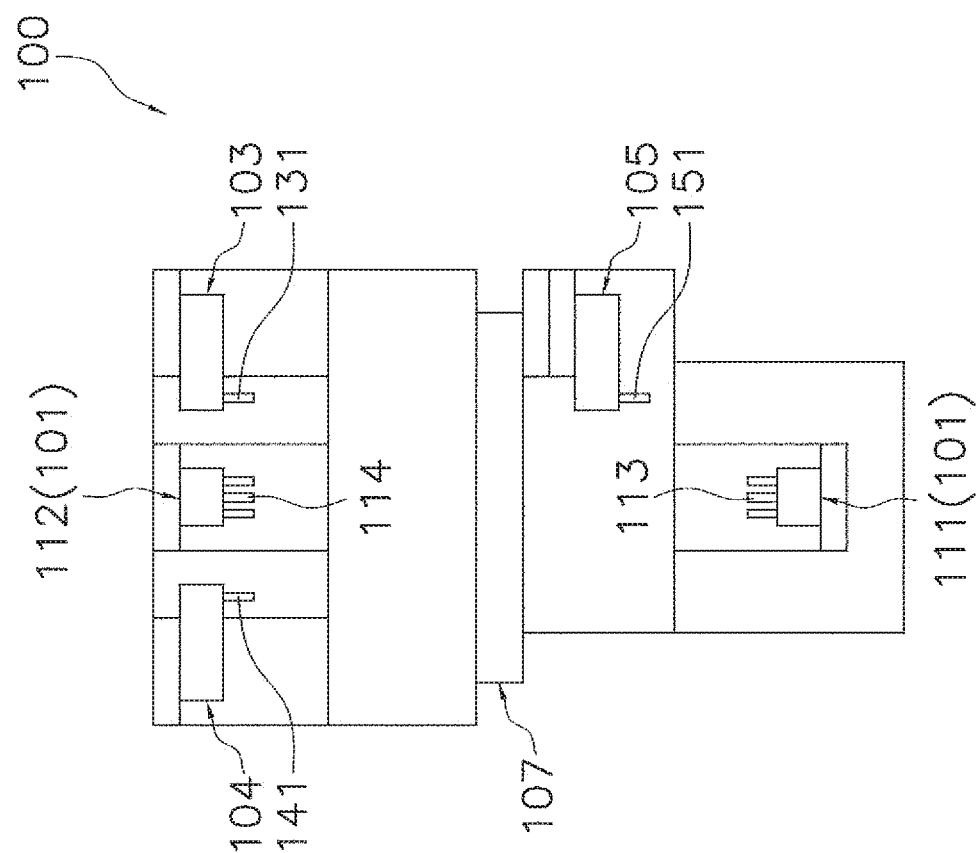
FIG. 16 is a schematic front view (excluding an impeller supporting device) of the apparatus for manufacturing the impeller.
Figure 17:
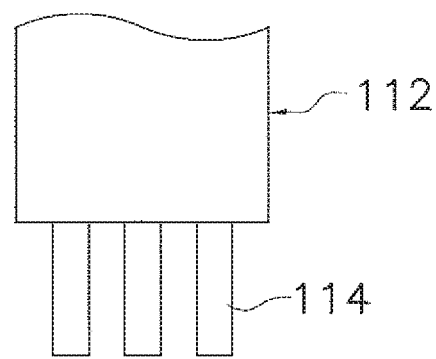
FIG. 17 is a schematic diagram showing insertion portions of a main plate-side ultrasonic horn and insertion portions of a shroud-side ultrasonic horn.
Figure 17:
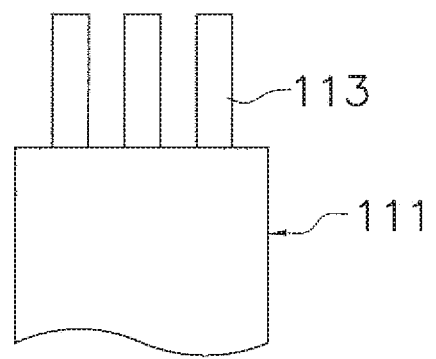
Figure 18:
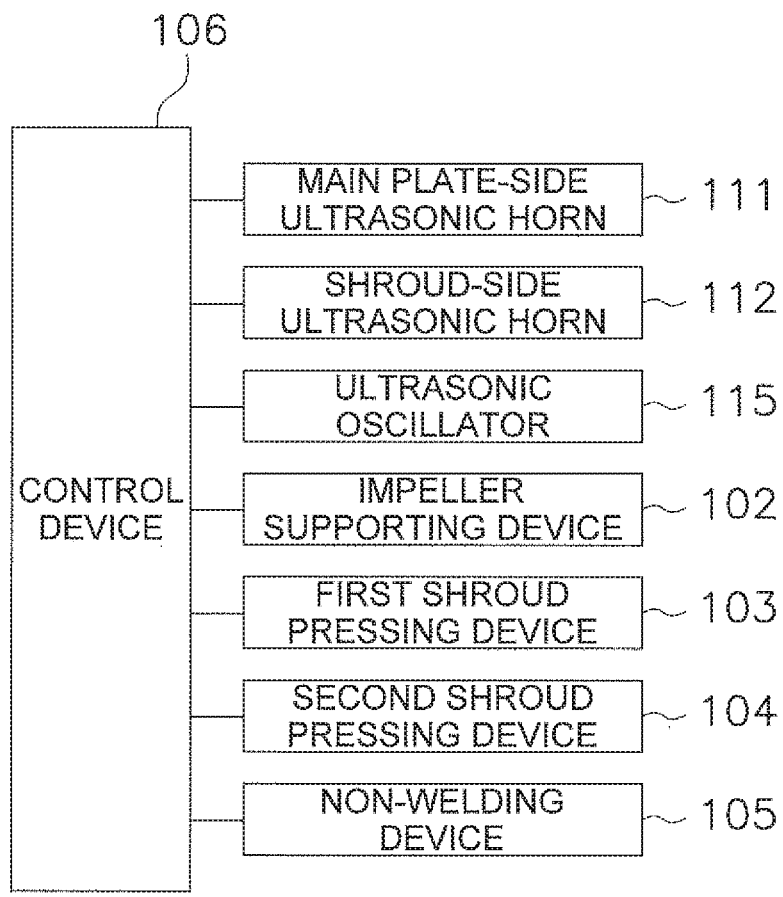
FIG. 18 is a control block diagram of the apparatus for manufacturing the impeller.
Figure 19:
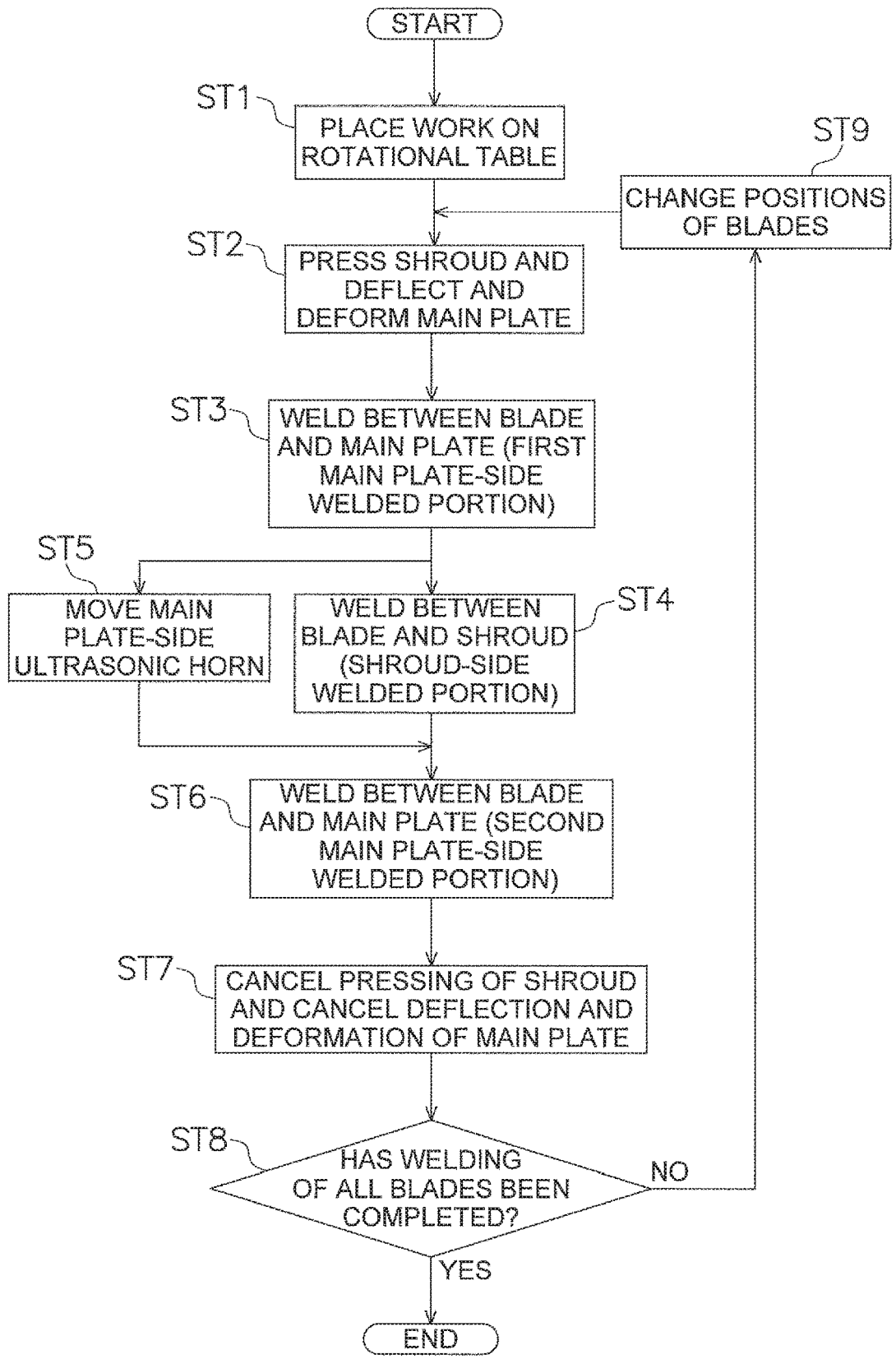
FIG. 19 is a flowchart showing a process of manufacturing the impeller.
Figure 20:
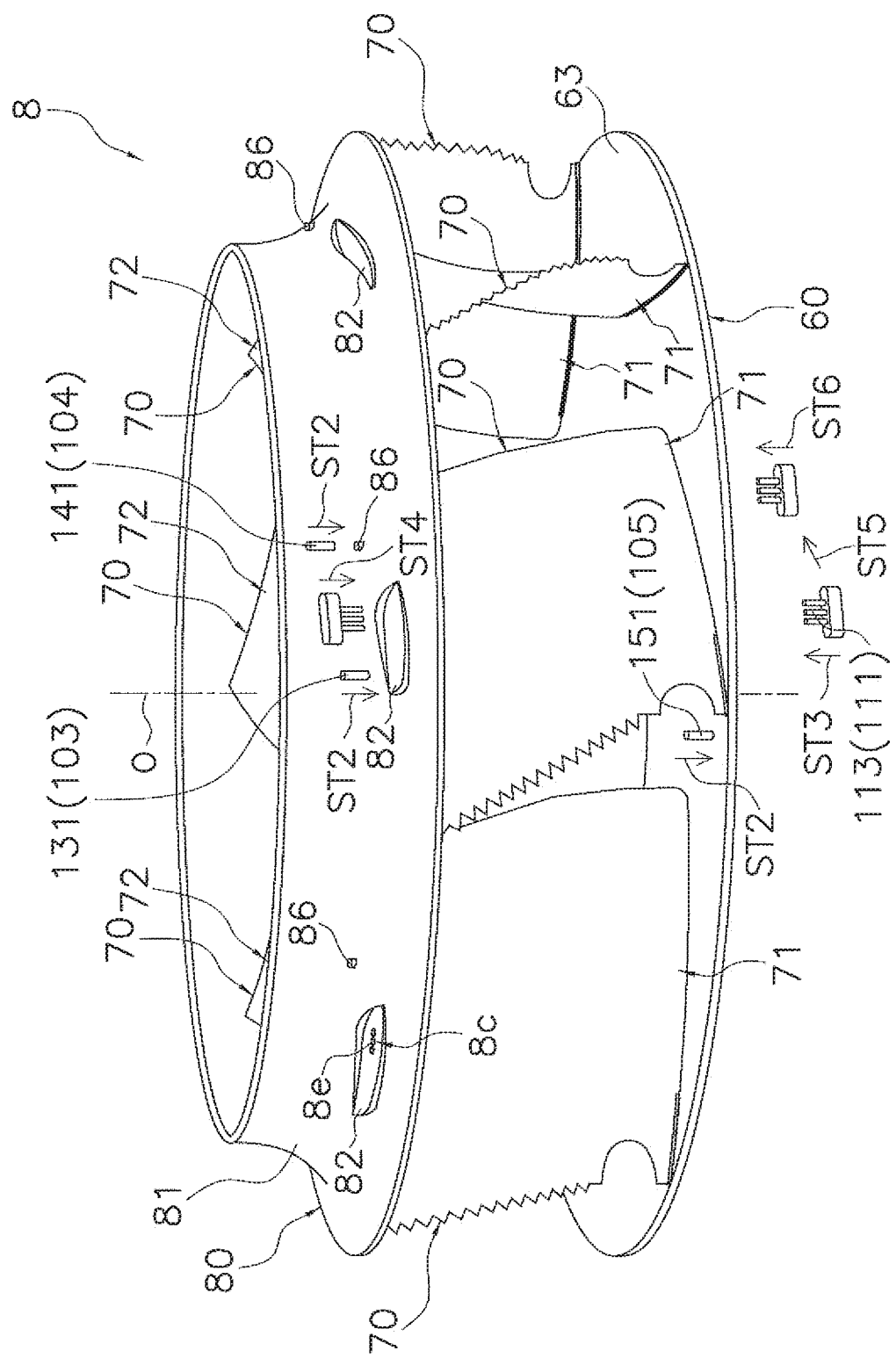
FIG. 20 is a diagram describing operational states of units of the manufacturing apparatus in the process of manufacturing the impeller.
Figure 21:
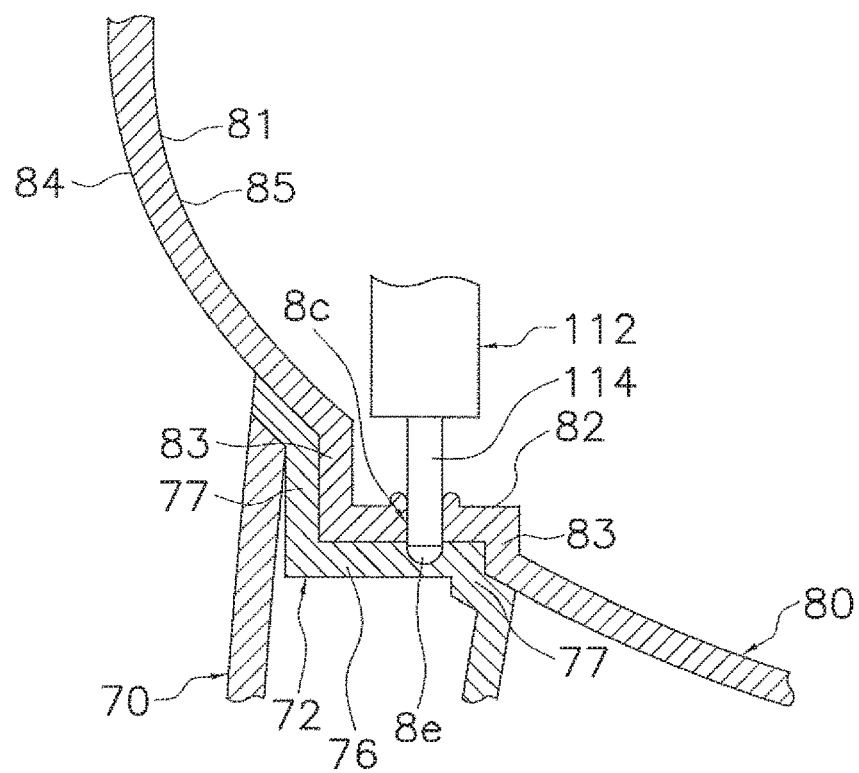
FIG. 21 is a diagram showing a state in which the insertion portions of the main plate-side and shroud-side ultrasonic horns are inserted into welding locations.
Figure 21:
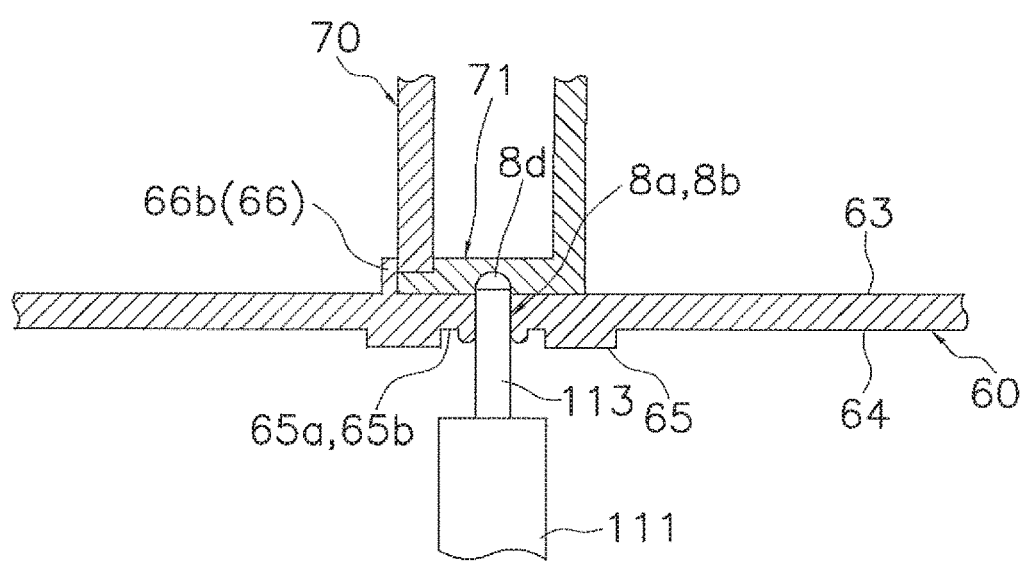
Figure 22:
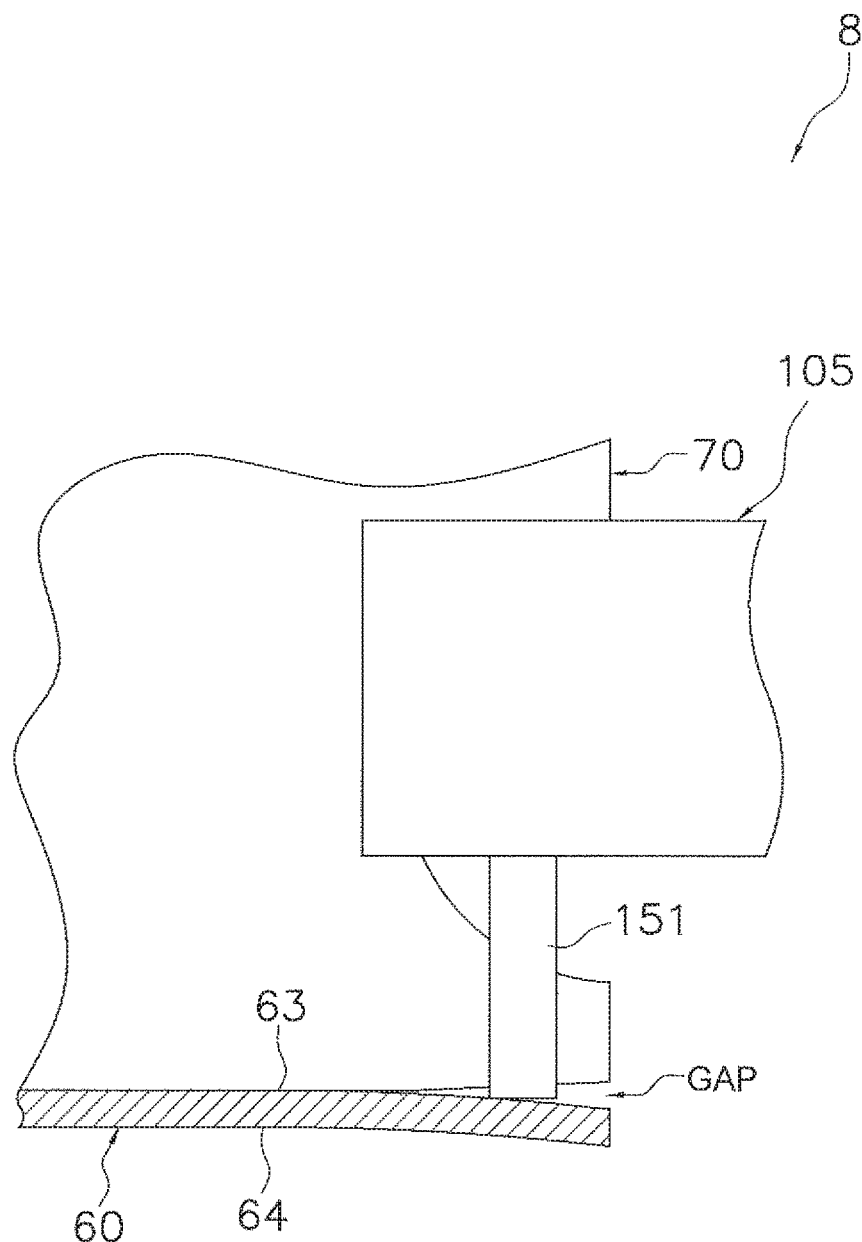
FIG. 22 is a diagram showing a state in which a non-welding device is used to deflect and deform an outer circumferential portion of the main plate.

Next, the method and apparatus for manufacturing the impeller 8 are described with reference to FIGS. 3 to 22. FIG. 14 is a schematic plan view of the apparatus 100 for manufacturing the impeller 8. FIG. 15 is a schematic side view of the apparatus 100 for manufacturing the impeller 8. FIG. 16 is a schematic front view (excluding an impeller supporting device 102) of the apparatus 100 for manufacturing the impeller 8. FIG. 17 is a schematic diagram showing insertion portions 113 of a main plate-side ultrasonic horn 111 and insertion portions 114 of a shroud-side ultrasonic horn 112. FIG. 18 is a control block diagram of the apparatus 100 for manufacturing the impeller 8. FIG. 19 is a flowchart showing a process of manufacturing the impeller 8. FIG. 20 is a diagram describing operational states of units of the manufacturing apparatus 100 in the process of manufacturing the impeller 8. FIG. 21 is a diagram showing a state in which the insertion portions 113 and 114 of the main plate-side and shroud-side ultrasonic horns 111 and 112 are inserted in welding locations. FIG. 22 is a diagram showing a state in which an outer circumferential portion of the main plate 60 is deflected and deformed using a non-welding device 105.

<Configuration of Apparatus for Manufacturing Impeller>

The apparatus 100 for manufacturing the impeller 8 manufactures the impeller 8 by welding between the multiple blades 70 arranged annularly around the rotational axis O and the main plate 60 and the shroud 80 arranged opposite to the two blade axial ends 71 and 72 that are both ends of each of the blades 70 in the direction of the rotational axis O. The manufacturing apparatus 100 mainly includes a welding device 101, the impeller supporting device 102, shroud pressing devices 103 and 104, the non-welding device 105, and a control device 106.

The welding device 101 mainly includes the main plate-side ultrasonic horn 111 and the shroud-side ultrasonic horn 112. The main plate-side ultrasonic horn 111 is an ultrasonic horn that gives ultrasonic vibration to the blade 70 and the main plate 60 to weld between the main plate 60 and the main plate-side blade axial end 71 among two blade axial ends 71 and 72. The shroud-side ultrasonic horn 112 is an ultrasonic horn that gives ultrasonic vibration to the blades 70 and the shroud 80 to weld between the shroud 80 and the other shroud-side blade axial end 72 among the two blade axial ends 71 and 72. In this embodiment, the main plate-side ultrasonic horn 111 includes the main plate-side insertion portions 113 that are inserted into the main plate 60 and the main plate-side blade axial end 71 so that the main plate-side insertion portions 113 extend through the main plate 60 to a portion of the main plate-side blade axial end 71, and the shroud-side ultrasonic horn 112 includes the shroud-side insertion portions 114 that are inserted into the shroud 80 and the shroud-side blade axial end 72 so that the shroud-side insertion portions 114 extend through the shroud 80 to a portion of the shroud-side blade axial end 72. The main plate-side ultrasonic horn 111 includes the multiple (three in this embodiment) main plate-side insertion portions 113 extending in the blade longitudinal direction of the main plate-side blade axial end 71. The shroud-side ultrasonic horn 112 includes the multiple (three in this embodiment) shroud-side insertion portions 114 extending in the blade longitudinal direction of the shroud-side blade axial end 72. The ultrasonic vibration to the main plate-side ultrasonic horn 111 and the shroud-side ultrasonic horn 112 is to be supplied by an ultrasonic oscillator 115 (shown in only FIG. 18). The main plate-side ultrasonic horn 111 and the shroud-side ultrasonic horn 112 are individually held by a base 107 so that the main plate-side ultrasonic horn 111 and the shroud-side ultrasonic horn 112 can be moved by an air cylinder or the like. In this embodiment, the main plate-side ultrasonic horn 111 and the shroud-side ultrasonic horn 112 are disposed to weld between one of the multiple blades 70 and the main plate 60, and between one of the multiple blades 70 and the shroud 80.

The impeller supporting device 102 supports the main plate 60, the multiple blades 70, and the shroud 80 rotatably around the rotational axis O. The impeller supporting device 102 mainly includes a rotational table 121 that is driven by a motor or the like. The rotational table 121 has a circular shape with a diameter smaller than that of the main plate 60. The rotational table 121 also has table notches 122 and table through-holes 123 that enable the main plate-side ultrasonic horn 111 to be inserted into the main plate 60 from the side of the opposite-blade-side main plate surface 64. The number of the table notches 122 and the number of the table through-holes 123 are respectively equal to the number of the blades 70 (or equal to 7 in this embodiment). The table notches 122 are arranged to correspond to portions where the first main plate-side welded portions 8a are formed, while the table through-holes 123 are arranged to correspond to portions where the second main plate-side welded portions 8b are formed. The impeller supporting device 102 is configured so that the rotational table 121 is rotated to align one of the multiple blades 70 to the main plate-side ultrasonic horn 111 and the shroud-side ultrasonic horn 112.

The shroud pressuring devices 103 and 104 are devices that press the shroud 80 toward the main plate 60, in welding between the main plate-side blade axial end 71 and the main plate 60 using the main plate-side ultrasonic horn 111. The shroud pressuring devices 103 and 104 mainly include pressing pins 131 and 141 for respectively pressing predetermined portions of the shroud 8. The shroud pressing devices 103 and 104 are configured to press the portions of the shroud 80 that are arranged opposite to portions, where the main plate-side insertion portions 113 are inserted into the main plate 60 and the main plate-side blade axial end 71, in the direction of the rotational axis O toward the main plate 60. Specifically, in this embodiment, the pressing pins 131 and 141 press the portions of the shroud 80 that are arranged opposite to the portions, where the main plate-side insertion portions 113 are inserted into the main plate 60 and the main plate-side blade axial end 71, in the direction of the rotational axis O. The first shroud pressing device 103 having the first pressing pin 131 is configured to press a shroud flat plate portion 82 of the shroud 80 that are arranged opposite to a portion where the first main plate-side welded portion 8a is formed, in the direction of the rotational axis O. The second shroud pressing device 104 having the second pressing pin 141 is configured to press the shroud flat surface 86a included in the shroud 80 and arranged opposite to a portion, where the second main plate-side welded portion 8b is formed, in the direction of the rotational axis O. The shroud pressing devices 103 and 104 are held by the base 107 so that the shroud pressing devices 103 and 104 can be moved by the air cylinder or the like, similarly to the main plate-side ultrasonic horn 111 and the shroud-side ultrasonic horn 112. In this embodiment, the shroud pressing devices 103 and 104 are provided to press the shroud 80 toward the main plate 60, in welding between one of the multiple blades 70 and the main plate 60, and between one of the multiple blades 70 and the shroud 80 using the main plate-side ultrasonic horn 111 and the shroud-side ultrasonic horn 112.

The non-welding device 105 is a device that deflects and deforms the main plate 60, in welding between the main plate-side blade axial end 71 and the main plate 60 using the main plate-side ultrasonic horn 111, to secure a gap between the blade rear edge-side portion of the main plate-side blade axial end 71 and a portion of the main plate 60 arranged on the side of the blade rear edge of the blade 70 with respect to portions where the main plate-side insertion portions 113 are inserted into the main plate 60 and the main plate-side blade axial end 71. The non-welding device 105 mainly includes a bending pin 151 for bending the outer circumferential portion of the main plate 60 in a direction where the outer circumferential portion of the main plate 60 goes away from the blade rear edge-side portion of the main plate-side blade axial end 71. The non-welding device 105 is held by the base 107 so that the non-welding device 105 can be moved by the air cylinder or the like, similarly to the main plate-side ultrasonic horn 111, the shroud-side ultrasonic horn 112, and the shroud pressing devices 103 and 104. In this embodiment, the non-welding device 105 is configured to deflect and deform the main plate 60 in welding between one of the multiple blades 70 and the main plate 60 using the main plate-side ultrasonic horn 11*l*.

The control device 106 (shown in only FIG. 18) is a device that controls and operates the aforementioned various devices, and belongs to the various devices and the base 107 or installed at a position separated from the various devices and the base 107. Operations of the manufacturing apparatus 100 are executed by the control device 106.

<Process of Manufacturing Impeller>

First, the blade bodies 73, the blade lid bodies 74, the main plate 60, and the shroud 80, which have been molded with resin, are prepared. Then, the blades 70 are assembled by engaging and attaching the blade lid bodies 74 with and to the blade bodies 73. Then, the multiple blades 70, the main plate 60, and the shroud 80 are temporarily assembled. In this embodiment, the blades 70 are arranged at the predetermined positions on the main plate 60 by inserting the main plate protrusions 67 of the main plate 60 into the main plate-side blade holes 75 of the main plate-side blade axial ends 71 of the blades 70 and are arranged at the predetermined positions on the shroud 80 by fitting the blade stepped portions 77 of the shroud-side blade axial ends 72 of the blades 70 to the shroud stepped portions 83 of the shroud 80.

Next, the multiple blades 70, the main plate 60, and the shroud 80 (which are referred to as work) that have been temporarily assembled are placed on the rotational table 121 of the impeller supporting device 102 (in step ST1). In this case, the work (of the temporarily assembled blades 70, main plate 60, and shroud 80) is placed on the rotational table 121 in a state in which the first opposite-blade-side main plate recesses 65a of the main plate 60 correspond to the table notches 122 and in which the second opposite-blade-side main plate recesses 65b of the main plate 60 correspond to the table through-holes 123.

Next, in processes of steps ST2 to ST9, the impeller 8 of the centrifugal fan 4 is completed by welding between two blade axial ends 71 and 72 of each of the multiple blades 70 and the main plate 60 and the shroud 80. The processes of steps ST2 to ST9 are executed by the control device 106. In this embodiment, as described below, the welding between each of the main plate-side blade axial ends 71 and the main plate 60 and the welding between each of the shroud-side blade axial ends 72 and the shroud 80 are conducted sequentially for each of the multiple blades 70.

First, in step ST2, the shroud 80 is pressed by the shroud pressing devices 103 and 104 toward the main plate 60 in welding between the main plate-side blade axial end 71 of the blade 70 and the main plate 60. Specifically, the shroud flat plate portion 82 is pressed by the pressing pin 131 of the first shroud pressing device 103 toward the main plate 60. As a result, a state is obtained where the blade rear edge-side portion of the main plate-side blade axial end 71 in the blade longitudinal direction is pressed toward the first opposite-blade-side main plate recess 65a of the main plate 60. The shroud flat surface 86a of the shroud 80 is pressed by the pressing pin 141 of the second shroud pressing device 104 toward the main plate 60. As a result, a state is obtained where the blade front edge-side portion of the main plate-side blade axial end 71 in the blade longitudinal direction is pressed toward the second opposite-blade-side main plate recess 65b of the main plate 60. In addition, in welding between the main plate-side blade axial end 71 of the blade 70 and the main plate 60, the main plate 60 is deflected and deformed by the bending pin 151 of the non-welding device 105 to bend the outer circumferential portion of the main plate 60 in the direction where the outer circumferential portion of the main plate 60 goes away from the blade rear edge-side portion of the main plate-side blade axial end 71. As a result, a state is obtained where a gap between the blade rear edge-side portion of the main plate-side blade axial end 71 and the main plate 60 is secured. Note that the pressing of the shroud 80 by the shroud pressing devices 103 and 104 and the deflection and deformation of the main plate 60 by the non-welding device 105 may be conducted in welding processes of steps ST3, ST4, and/or ST6 described later.

Next, in step ST3, the ultrasonic oscillator 115 supplies ultrasonic vibration to the main plate-side ultrasonic horn 111, and the main plate-side insertion portions 113 of the main plate-side ultrasonic horn 111 give the ultrasonic vibration to the blade 70 and the main plate 60. In this embodiment, the ultrasonic vibration is given to the blade 70 and the main plate 60 from the first opposite-blade-side main plate recess 65a arranged opposite to the shroud flat plate portion 82 in the direction of the rotational axis O. Specifically, the main plate-side insertion portions 113 are inserted into the main plate 60 and the main plate-side plate axial end 71 so that the main plate-side insertion portions 113 extend through the main plate 60 (the first opposite-blade-side main plate recess 65a in this embodiment) to a portion of the main plate-side plate axial end 71. As a result, the main plate-side blade axial end 71 and the main plate 60 are melted so that the main plate-side welding holes 8d that am recesses extending through the main plate 60 to portions of the main plate-side blade axial end 71 are formed on the blade rear edge-side portion of the main plate-side blade axial end 71 in the blade longitudinal direction of the main plate-side blade axial end 71 and on the first opposite-blade-side main plate recess 65a of the main plate 60. Then, the first main plate-side welded portion 8a having the main plate-side welding holes 8d is formed. In this embodiment, a plurality of the main plate-side welding holes 8d are formed by the multiple (three in this embodiment) main plate-side insertion portions 113 and arranged in the blade longitudinal direction of the main plate-side blade axial end 71.

Next, in step ST4, the ultrasonic oscillator 115 supplies ultrasonic vibration to the shroud-side ultrasonic horn 112, and the shroud-side insertion portions 114 of the shroud-side ultrasonic horn 112 gives the ultrasonic vibration to the blade 70 and the shroud 80. In this embodiment, the ultrasonic vibration is given from the shroud flat plate portion 82 to the blade 70 and the shroud 80. Specifically, the shroud-side insertion portions 114 are inserted into the shroud 80 and the shroud-side blade axial end 72 so that the shroud-side insertion portions 114 extend through the shroud 80 (the shroud flat plate portion 82 in this embodiment) to a portion of the shroud-side blade axial end 72. As a result, the shroud-side blade axial end 72 and the shroud 80 are melted so that the shroud-side welding holes 8e that are recesses extending through the shroud 80 to portions of the shroud-side blade axial end 72 are formed on a nearly central portion of the shroud-side blade axis end portion 72 in the blade longitudinal direction of the shroud-side blade axis end portion 72 and on the shroud flat plate portion 82 of the shroud 80. Then, the shroud-side welded portion 8c having the shroud-side welding holes 8e is formed. In this embodiment, a plurality of the shroud-side welding holes 8e are formed by the multiple (three in this embodiment) shroud-side insertion portions 114 and arranged in the blade longitudinal direction of the shroud-side blade axial end 72.

In step ST5 in parallel with the process of step ST4, the main plate-side ultrasonic horn 111 is moved from a position (the position of the table notch 122) corresponding to the first opposite-blade-side main plate recess 65a of the main plate 60 to a position (the position of the table through-hole 123) corresponding to the second opposite-blade-side main plate recess 65b of the main plate 60. Note that when the main plate-side ultrasonic horn 111 is arranged to respectively correspond to two welding locations on the side of the main plate 60, this process is not required.

Next, in step ST6, the ultrasonic oscillator 115 supplies ultrasonic vibration to the main plate-side ultrasonic horn 111 and the main plate-side insertion portions 113 of the main plate-side ultrasonic horn 111 give ultrasonic vibration the to the blade 70 and the main plate 60. In this embodiment, the ultrasonic vibration is given to the blade 70 and the main plate 60 from the second opposite-blade-side main plate recess 65b arranged opposite to the shroud flat plate surface 86a in the direction of the rotational axis O. Specifically, the main plate-side insertion portions 113 are inserted through the main plate 60 (second opposite-blade-side main plate recess 65b in this embodiment) to a portion of the main plate-side blade axial end 71. As a result, the main plate-side blade axial end 71 and the main plate 60 are melted so that the main plate-side welding holes 8d that are recesses extending through the main plate 60 to portions of the main plate-side blade axial end 71 are formed on the blade rear edge-side portion of the main plate-side blade axis and portion 71 in the blade longitudinal direction and on the second opposite-blade-side recess 65b of the main plate 60. Then, the second main plate-side welded portion 8b having the main plate-side welding holes 8d is formed. In this embodiment, a plurality of the main plate-side welding holes 8d are formed by the multiple (three in this case) main plate-side insertion portions 113 and arranged in the blade longitudinal direction of the main plate-side blade axial end 71.

Next, in step ST7, the pressing of the shroud 80 by the shroud pressing devices 103 and 104 and the deflection and deformation of the main plate 60 by the non-welding device 105 are cancelled. Note that, in this embodiment, this process is required because the pressing of the shroud 80 by the shroud pressing devices 103 and 104 and the deflection and deformation of the main plate 60 by the non-welding device 105 are collectively conducted in step ST2. However, this process is not required when the pressing of the shroud 80 by the shroud pressing devices 103 and 104 and the deflection and deformation of the main plate 60 by the non-welding device 105 are separately conducted in the welding processes of steps ST3, ST4, and/or ST6, the pressing of the shroud 80 by the shroud pressing devices 103 and 104 and the deflection and deformation of the main plate 60 by the non-welding device 105 are cancelled in each of the welding processes.

Next, in step ST8, it is determined whether or not the welding between all of the blades 70 and the main plate 60 and the shroud 80 has been completed. When the welding of all the blades 70 and the main plate 60 and the shroud 80 has been completed, the process of manufacturing the impeller 8 ends. As a result, the impeller 8 is completed.

In contrast, when the welding of at least any of all the blades 70 and the main plate 60 and the shroud 80 has not been completed, the rotational table 122 of the impeller supporting device 102 is rotated and moved to a position corresponding to the blade 70 arranged adjacent to the welded blade 70 in a circumferential direction in step ST9. Then, the processes of steps ST2 to ST9 are repeated until the welding of all the blades 70 and the main plate 60 and the shroud 80 is completed.

(4) Features of Impeller of Centrifugal Fan and Features of Method and Apparatus for Manufacturing Impeller The impeller 8 of the centrifugal fan 4 and the method and apparatus for manufacturing the impeller 8 have the following features.

<A>

In order to inexpensively manufacture the impeller 8 of the centrifugal fan 4 by welding between the multiple blades 70 arranged annularly around the rotational axis O and the main plate 60 and shroud 80 arranged opposite to two blade axial ends 71 and 72 that are both ends of each of the blades 70 in the direction of the rotational axis O, it is necessary to reduce molds to be used and molding processes for forming, in advance, edges, through-holes, and protrusions that are required for welding, make smaller the areas of welded portions, and downsize ultrasonic horns and an ultrasonic oscillator to be included.

In this embodiment, as described above, the main plate-side welded portions 8a and 8b having the main plate-side welding holes 8d and 8e that are the recesses extending through the main plate 60 to the portions of the main plate-side blade axial ends 71 are formed, and the shroud-side welded portions 8c having the shroud-side welding holes 8e that are the recesses extending through the shroud 80 to the shroud-side blade axial ends 72 are formed. The welded portions 8a, 8b, and 8c having the welding holes 8d and 8e can be obtained by conducting the ultrasonic welding using the ultrasonic horns 111 and 112 having the insertion portions 113 and 114 to be inserted into the main plate 60, the shroud 80, and the blade axial ends 71 and 72 so that the insertion portions 113 and 114 extend through the main plate 60 and the shroud 80 to the portions of the blade axial ends 71 and 72. In other words, in welding between the main plate-side blade axial ends 71 and the main plate 60, the main plate-side welded portions 8a and 8b having the main plate-side welding holes 8d are formed by giving the ultrasonic vibration to the blades 70 and the main plate 60 using the main plate-side ultrasonic horn 111 having the main plate-side insertion portions 113 and melting the main plate-side blade axial ends 71 and the main plate 60 so that the main plate-side welding holes 8d that are the recesses extending through the main plate 60 to the portions of the main plate-side blade axial ends 71 are formed. In addition, in welding between the shroud-side blade axial ends 72 and the shroud 80, the shroud-side welded portions 8c having the shroud-side welding holes 8e are formed by giving the ultrasonic vibration to the blades 70 and the shroud 80 using the shroud-side ultrasonic horn 112 having the shroud-side insertion portions 114 and melting the shroud-side blade axial ends 72 and the shroud 80 so that the shroud-side welding holes 8e that are the recesses extending through the shroud 80 to the portions of the shroud-side blade axial ends 72 are formed. In the case where the welded portions 8a, 8b, and 8c having the welding holes 8d and 8e are formed, it is possible to reduce the molds and molding processes for forming, in advance, the edges, through-holes, and protrusions that are required for the conventional ultrasonic welding, and make smaller the areas of the welded portions. When the areas of the welded portions are reduced, it is possible to downsize the ultrasonic horns and reduce output of the ultrasonic oscillator.

In this manner, it is possible to inexpensively manufacture the impeller 8 of the centrifugal fan 4 by welding between the multiple blades 70 arranged annularly around the rotational axis and the main plate 60 and shroud 80 arranged opposite to two blade axial ends 71 and 72 that are both ends of each of the blades 70 in the direction of the rotational axis O.

<B>

In this embodiment, as described above, the main plate-side ultrasonic horn 111 has the multiple main plate-insertion portions 113 extending in the blade longitudinal direction of the main plate-side blade axial ends 71 and the shroud-side ultrasonic horn 112 has the multiple shroud-insertion portions 114 extending in the blade longitudinal direction of the shroud-side blade axial ends 72. Thus, the multiple main plate-side welding holes 8d are arranged in the blade longitudinal directions of the main plate-side blade axial ends 71, while the multiple shroud-side welding holes 8e are arranged in the blade longitudinal directions of the shroud-side blade axial ends 72.

As a result, it is possible to strongly weld between the main plate-side blade axial ends 71 and the main plate 60 and between the shroud-side blade axial ends 72 and the shroud 80 in this embodiment.

<C>

In this embodiment, the main plate-side welding holes 8d are open on the opposite-blade-side main plate surface 64 of the main plate 60, and built-up portions are formed around the openings of the main plate-side welding holes 8d by melting the main plate 60 and the blades 70 upon the welding. Since the built-up portions protrude, in the direction of the rotational axis O, above the opposite-blade-side main plate surface 64 of the main plate 60, the built-up portions may cause ventilation resistance during operation of the centrifugal fan 4 and may cause noise.

In this embodiment, as described above, the protrusion-shaped opposite-blade-side main plate protrusions 65 are formed on the opposite-blade-side main plate surface 64 at positions corresponding to the main plate-side blade axial ends 71, the recess-shaped opposite-blade-side main plate recesses 65a and 65b are formed on the opposite-blade-side main plate protrusions 65, and the main plate-side welded portions 8a and 8b are formed by giving the ultrasonic vibration to the opposite-blade-side main plate recesses 65a and 65b. Thus, in this embodiment, the built-up portions formed around the main plate-side welding holes 8d of the main plate-side welded portions 8a and 8b are arranged on the opposite-blade-side main plate recesses 65a and 65b and protrude, in the direction of the rotational axis O, above the opposite-blade-side main plate recesses 65a and 65b, but the protrusion of the built-up portions can be downsized to a protrusion that is equal to or smaller than the opposite-blade-side main plate protrusions 65 arranged around the opposite-blade-side main plate recesses 65a and 65b.

As a result, the probability can be reduced that the built-up portions formed around the openings of the main plate-side welding holes 8d may cause ventilation resistance during the operation of the centrifugal fan 4 in this embodiment.

<D>

In this embodiment, since the shroud 80 is a bell-shaped member that is curved such that the diameter decreases with the increase of a distance from the blades 70 in the direction of the rotational axis O, it is not easy to weld between the bell-shaped shroud curved plate portion 81 and the shroud-side blade axial ends 72.

In this embodiment, as described above, the shroud-side welded portions 8c are obtained by forming the plate-shaped shroud flat plate portions 82 corresponding to the shroud-side blade axial ends 72 on the shroud 80, giving the ultrasonic vibration from the shroud flat plate portions 82 to the blades 70 and the shroud 80, and welding between the shroud-side blade axial ends 72 and the shroud flat plate portions 82.

As a result, the shroud-side blade axial ends 72 and the shroud 80 can be strongly welded together in this embodiment.

<E>

In this embodiment, as described above, the shroud flat plate portions 82 are arranged to correspond to the nearly central portions of the shroud-side blade axial ends 72 in the blade longitudinal directions of the shroud-side blade axial ends 72, and the shroud-side blade axial ends 72 and the shroud 80 are welded together by giving the ultrasonic vibration to the shroud flat plate portions 82 and the nearly central portions of the shroud-side blade axial ends 72 in the blade longitudinal directions of the shroud-side blade axial ends 72.

As a result, the shroud-side blade axial ends 72 and the shroud 80 can be strongly welded together, compared with the case where the blade front edge-side portions or blade rear edge-side portions of the shroud-side blade axial ends of the blades 70 are welded together with the shroud 80, and the areas of the shroud flat plate portions 82 and the areas of the shroud-side welded portions 8c formed by the welding can be reduced in this embodiment.

<F>

In this embodiment, as described above, the weir portions 66 are formed along the blade rear edge-side portions of the main plate-side blade axial ends 71 on the main plate 60.

As a result, even when the main plate 60 and the blades 70 are melted upon the welding of the main plate-side blade axial ends 71 and the main plate 60 in this embodiment, the flow of melted portions from the gaps between the blade rear edge-side portions of the main plate-side blade axial ends 71 and the main plate 60 can be decreased by the weir portions 66.

<G>

In this embodiment, as described above, the main plate-side ultrasonic horn 111 and the shroud-side ultrasonic horn 112 are provided to weld between any of the multiple blades 70 and the main plate 60 and the shroud 80. The impeller supporting device 102 is provided to support the main plate 60, the multiple blades 70, and the shroud 80 rotatably around the rotational axis O so as to align one of the multiple blades 70 with respect to the main plate-side ultrasonic horn 111 and the shroud-side ultrasonic horn 112. With these configurations, the welding between each of the main plate-side blade axial ends 71 and the main plate 60 and the welding between each of the shroud-side blade axial ends 72 and the shroud 80 are conducted sequentially for each of the multiple blades 70.

As a result, the ultrasonic horns can be further downsized and the output of the ultrasonic oscillator can be further reduced in this embodiment, compared with the case where the multiple blades 70 are collectively welded using a large ultrasonic horn having a size sufficient to cover the entire main plate 60 and the entire shroud 80.

<H>

In welding between the main plate-side blade axial ends 71 and the main plate 60, in the case where the ultrasonic vibration is given to the blades 70 and the main plate 60 from the main plate side, the main plate 60 is pressed using the main plate-side ultrasonic horn 111 toward the shroud 80.

In this embodiment, as described above, the shroud pressing devices 103 and 104 are provided to press the shroud 80 toward the main plate 60 in welding between the main plate-side blade axial ends 71 and the main plate 60 using the main plate-side ultrasonic horn 111.

As a result, the shroud 80 can be pressed toward the main plate 60 and receive a pressing force from the main plate 60 side that is caused by the main plate-side ultrasonic horn 111, in welding between the main plate-side axial ends 71 and the main plate 60, in this embodiment.

<I>

In this embodiment, as described above, the shroud pressing devices 103 and 104 are provided to press the portions of the shroud 80, toward the main plate 60 that are arranged opposite to the portions, where the main plate-side insertion portions 113 are inserted into the main plate 60 and the main plate-side blade axial ends 71, in the direction of the rotational axis O.

As a result, the portions of the shroud 80 that most need to be pressed toward the main plate 60 can be pressed in welding between the main plate-side blade axial ends 71 and the main plate 60 in this embodiment.

However, since the shroud 80 is the bell-shaped member that is curved such that the diameter decreases with the increase of a distance from the blades 70 in the direction of the rotational axis O, it is not easy to appropriately press the shroud 80 toward the main plate 60.

In this embodiment, as described above, the shroud flat surfaces 86a are formed on the opposite-blade-side shroud surface 85 of the shroud 80 and arranged opposite to the main plate-side welded portions 8b in the direction of the rotational axis O. Thus, in welding between the main plate-side blade axial ends 71 and the main plate 60, the ultrasonic vibration can be given to the blades 70 and the main plate 60 from the portions of the main plate 60 that are arranged opposite to the shroud flat surfaces 86a in the direction of the rotational axis O, while the shroud flat surfaces 86a of the shroud 80 that are more effective for pressing toward the main plate 60 than the shroud curved plate portion 81 are pressed toward the main plate 60. Especially, in this embodiment, since the shroud flat surfaces 86a are arranged opposite to the second main plate-side welded portions 8b in the direction of the rotational axis O, the portions of the shroud 80 that most need to be pressed toward the main plate 60 can be appropriately pressed.

In this embodiment, as described above, the shroud flat plate portions 82 formed to weld between the shroud-side blade axial ends 72 and the shroud 80 are arranged opposite to the first main plate-side welded portions 8a in the direction of the rotational axis O. Thus, in welding between the main plate-side blade axial ends 71 and the main plate 60, the ultrasonic vibration can be given to the blades 70 and the main plate 60 from the portions of the main plate 60 that are arranged opposite to the shroud flat plate portions 82 in the direction of the rotational axis O, while the shroud flat plate portions 82 of the shroud 80 that are more effective for pressing toward the main plate 60 than the shroud curved plate portion 81 are pressed toward the main plate 60. Especially, in this embodiment, since the shroud flat plate portions 82 are arranged opposite to the first main plate-side welded portions 8a in the direction of the rotational axis O, the portions of the shroud 80 that most need to be pressed toward the main plate 60 can be appropriately pressed.

As a result, the shroud 80 can be appropriately pressed toward the main plate 60 in welding between the main plate-side blade axial ends 71 and the main plate 60 in this embodiment.

<J>

As described above, the main plate-side welded portions 8a and 8b are formed by welding between the main plate-side blade axial ends 71 and the main plate 60. In this case, however, portions arranged on the rear edge side of the blades with respect to the main plate-side welded portions 8a and 8b may be also weakly welded. If the portions arranged on the rear edge side of the blades with respect to the main plate-side welded portions 8a and 8b are weakly welded, the weakly welded portions may be removed during the operation of the centrifugal fan 4 and may cause abnormal noise.

In this embodiment, as described above, in the state in which the gaps between the blade rear edge-side portions of the main plate-side blade axial ends 71 and the main plate 60 are secured by the unwelded portions 8f, the ultrasonic vibration is given to the blades 70 and the main plate 60 from the portions of the main plate 60 that are arranged on the front edge side of the blades with respect to the gaps.

In this embodiment, as described above, in welding between the main plate-side blade axial ends 71 and the main plate 60, in the state in which the gaps between the blade rear edge-side portions of the main plate-side blade axial ends 71 and the main plate 60 are secured by deflecting and deforming the main plate 60 using the non-welding device 105, the ultrasonic vibration is given to the blades 70 and the main plate 60 from the portions of the main plate 60 that are arranged on the front edge side of the blades with respect to the gaps.

This can reduce the probability that the portions arranged on the rear edge side of the blades with respect to the main plate-side welded portions 8a and 8b are weakly welded, and decrease the occurrence of abnormal noise during the operation of the centrifugal fan 4.

Note that, in this embodiment, the unwelded portions 8f are arranged on the side of the impeller 8 and the non-welding device 105 is also arranged on the side of the manufacturing apparatus 100, but the unwelded portions 8f or the non-welding device 105 may not be arranged.

INDUSTRIAL APPLICABILITY

The present invention is broadly applicable to an impeller of a centrifugal fan, and a method and apparatus for manufacturing the impeller of the centrifugal fan, where the impeller being manufactured by welding between multiple blades arranged annularly around a rotational axis and a main plate and a shroud, the main plate and the shroud being respectively arranged opposite to two blade axial ends that are both ends of each of the blades in the direction of the rotational axis.

What is claimed is:

1. An impeller of a centrifugal fan, the impeller comprising:
   multiple blades arranged annularly around a rotational axis, each blade having two blade axial ends wherein both of the blade axial ends are along a direction of the rotational axis;
   a main plate arranged opposite to a main plate-side blade axial end that is one of the two blade axial ends of each of the blades;
   a shroud arranged opposite to a shroud-side blade axial end that is an other of the two blade axial ends of each of the blades,
   main plate-side welded portions between each of the main plate-side blade axial ends and the main plate, the main plate-side welded portions having main plate-side welding holes extending completely through the main plate and partially through each of the main plate-side blade axial ends; and
   shroud-side welded portions between each of the shroud-side blade axial ends and the shroud, the shroud-side welded portions having shroud-side welding holes extending completely through the shroud and partially through each of the shroud-side blade axial ends.

2. The impeller of the centrifugal fan according to claim 1, wherein
   the main plate has a blade-side main plate surface arranged opposite to each of the main plate-side blade axial ends and an opposite-blade-side main plate surface that is an opposite surface of the blade-side main plate surface along the direction of the rotational axis, the opposite-blade-side main plate surface includes opposite-blade-side main plate protrusions at positions corresponding to each of the main plate-side blade axial ends, the opposite-blade-side main plate protrusions include opposite-blade-side main plate recesses, and the main plate-side welded portions are arranged on the opposite-blade-side main plate recesses.

3. The impeller of the centrifugal fan according to claim 1, wherein the shroud includes plate-shaped shroud flat plate portions disposed at positions corresponding to each of the shroud-side blade axial ends, and the shroud-side welded portions are arranged on each of the corresponding shroud flat plate portions.

4. The impeller of the centrifugal fan according to claim 3, wherein the shroud flat plate portions are arranged opposite to the main plate-side welded portions along the direction of the rotational axis.

5. The impeller of the centrifugal fan according to claim 1, wherein the shroud has a blade-side shroud surface arranged opposite to the shroud-side blade axial ends and an opposite-blade-side shroud surface that is an opposite surface of the blade-side shroud surface along the direction of the rotational axis, and the opposite-blade-side shroud surface includes shroud flat surfaces arranged opposite to the main plate-side welded portions along the direction of the rotational axis.

6. The impeller of the centrifugal fan according to claim 1, further comprising:

unwelded portions located on the main plate-side blade axial ends or the main plate to secure gaps between each of the main plate-side blade axial ends and the main plate on a rear edge side of the blades with respect to the main plate-side welded portions.

7. The impeller of the centrifugal fan according to claim 1, wherein the main plate includes weir portions arranged along blade rear edge-side portions of each of the main plate-side blade axial ends.

* * * * *